(12) United States Patent
Goldenberg et al.

(10) Patent No.: US 12,411,321 B1
(45) Date of Patent: Sep. 9, 2025

(54) LARGE-APERTURE COMPACT SCANNING TELE CAMERAS

(71) Applicant: Corephotonics Ltd., Tel Aviv (IL)

(72) Inventors: Ephraim Goldenberg, Tel Aviv (IL); Yiftah Kowal, Tel Aviv (IL); Gal Shabtay, Tel Aviv (IL); Itamar Boral, Tel Aviv (IL); Ziv Shemesh, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 19/204,545

(22) Filed: May 11, 2025

Related U.S. Application Data

(63) Continuation of application No. 19/000,742, filed on Dec. 24, 2024, now Pat. No. 12,326,545, which is a continuation of application No. 18/718,461, filed as application No. PCT/IB2022/060748 on Nov. 8, 2022, now Pat. No. 12,216,259.

(60) Provisional application No. 63/380,786, filed on Oct. 25, 2022, provisional application No. 63/297,256, filed on Jan. 7, 2022, provisional application No. 63/289,323, filed on Dec. 14, 2021.

(51) Int. Cl.
| | | |
|---|---|---|
| G02B 13/00 | (2006.01) | |
| G02B 13/02 | (2006.01) | |
| G02B 26/10 | (2006.01) | |
| G03B 13/36 | (2021.01) | |
| G03B 17/17 | (2021.01) | |
| H04N 23/54 | (2023.01) | |

(52) U.S. Cl.
CPC ......... *G02B 13/0065* (2013.01); *G02B 13/02* (2013.01); *G02B 26/108* (2013.01); *G03B 13/36* (2013.01); *G03B 17/17* (2013.01); *H04N 23/54* (2023.01)

(58) Field of Classification Search
CPC .. G02B 13/0065; G02B 13/02; G02B 26/108; H04N 23/54; G03B 13/36; G03B 17/17
USPC ...................................................... 359/745
See application file for complete search history.

(56) References Cited

U.S. PATENT DOCUMENTS 5,124,539 A * 6/1992 Krichever .......... G06K 7/10643
359/220.1

\* cited by examiner

*Primary Examiner* — William Choi
(74) *Attorney, Agent, or Firm* — Nathan & Associates; Menachem Nathan

(57) ABSTRACT

Scanning Tele cameras (STCs) based on two optical path folding element (OPFE) field-of-view scanning and mobile devices including such STCs. A STC may comprise a first OPFE (O-OPFE) for folding a first optical path OP1 to a second optical path OP2, an O-OPFE actuator, a second OPFE (I-OPFE) for folding OP2 to a third optical path OP3, an I-OPFE actuator, a lens, a lens actuator and an image sensor, wherein the STC has a STC native field-of-view (n-$FOV_T$), wherein the O-OPFE actuator is configured to rotate the O-OPFE around a first axis and the I-OPFE actuator rotates the I-OPFE around a second axis for scanning a scene with the n-$FOV_T$, wherein the lens actuator is configured to move the lens for focusing along a third axis, and wherein the first axis is perpendicular to the second axis and parallel to the third axis.

20 Claims, 21 Drawing Sheets

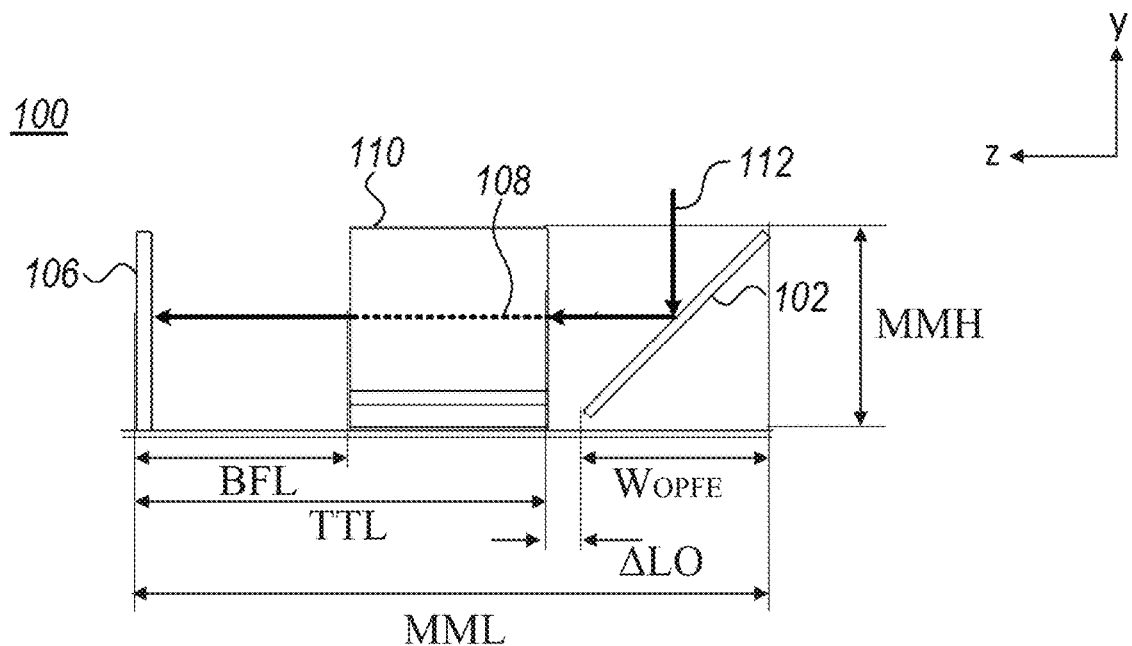
FIG. 1A  KNOWN ART
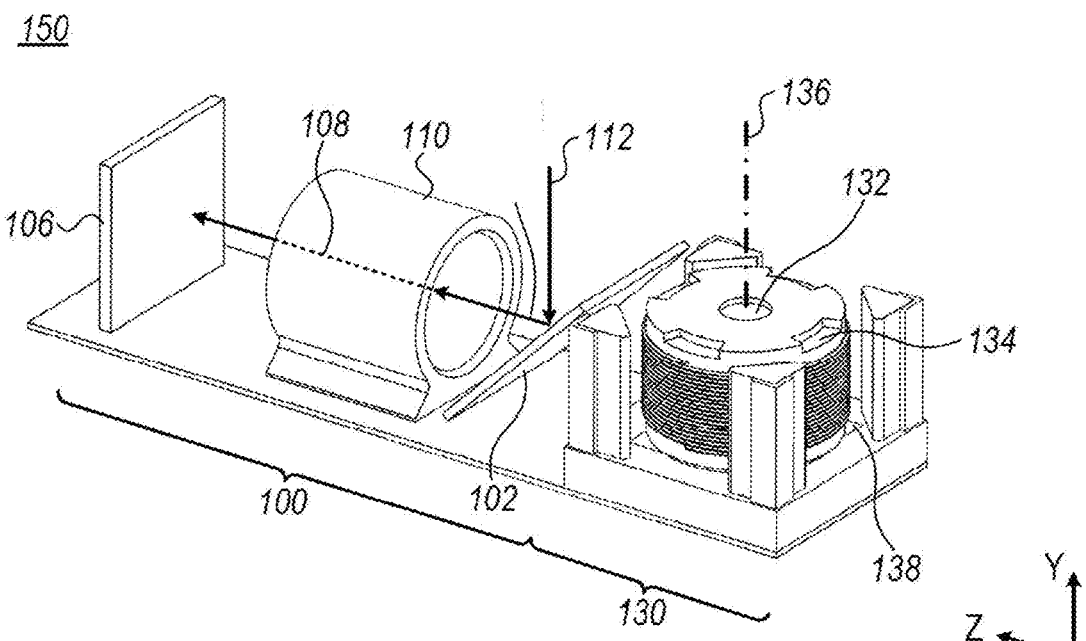
FIG. 1B  KNOWN ART

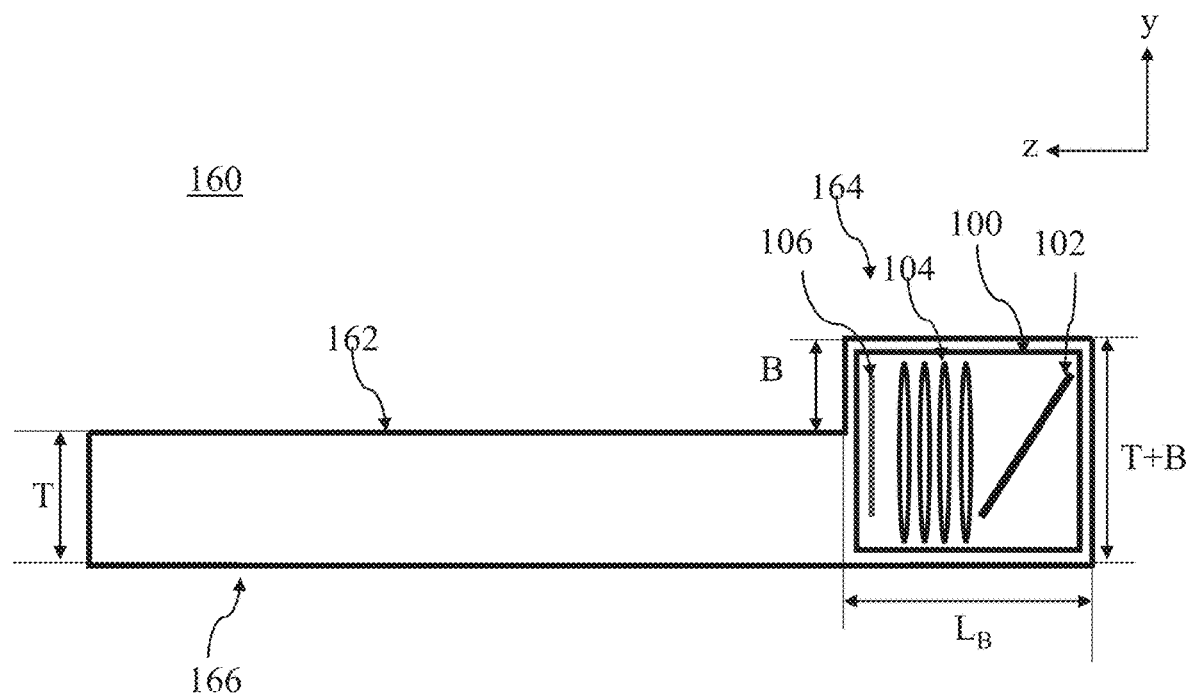
KNOWN ART
FIG. 1C
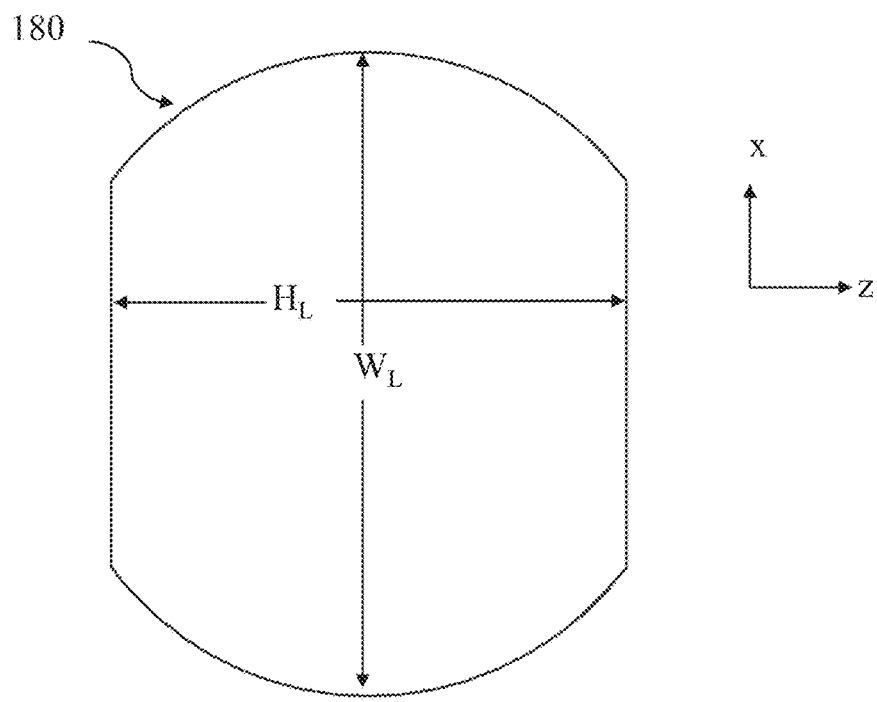
FIG. 1D    KNOWN ART

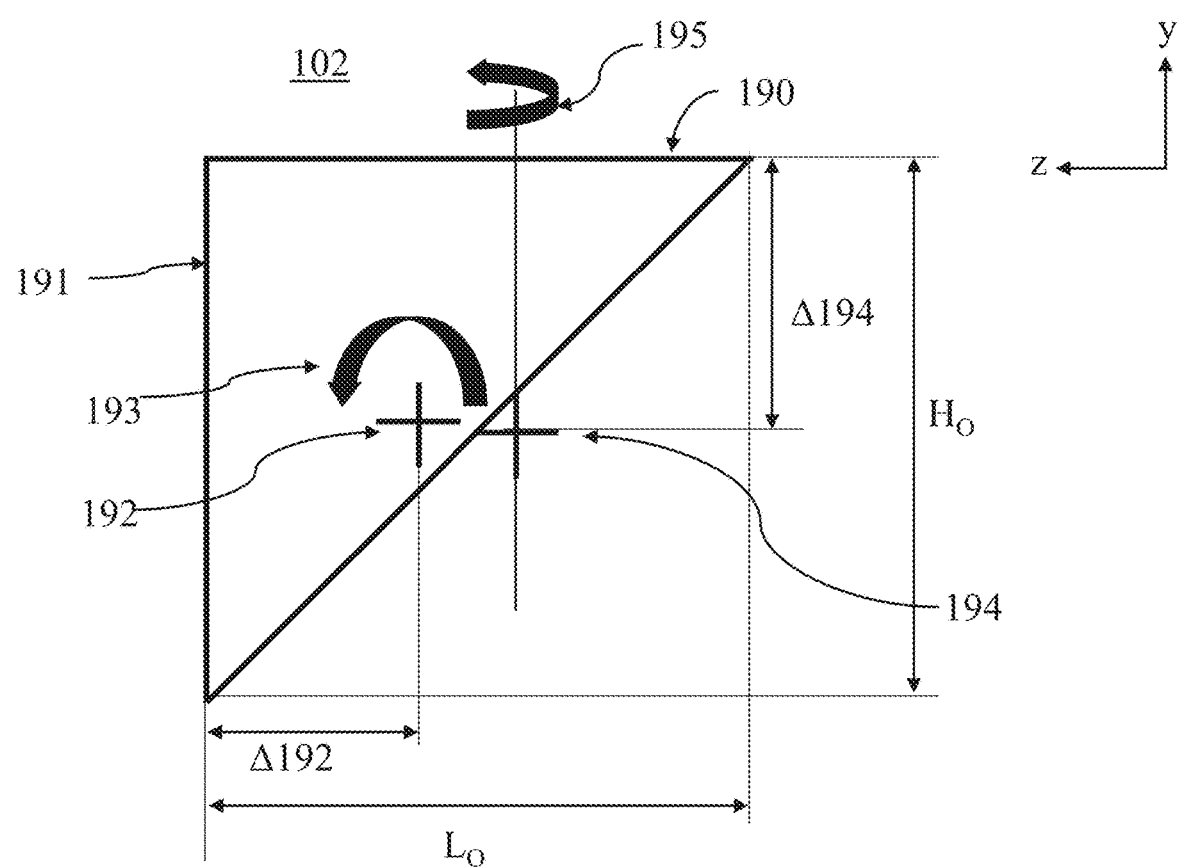
FIG. 1E  KNOWN ART

LARGE-APERTURE COMPACT SCANNING TELE CAMERAS

CROSS REFERENCE TO RELATED APPLICATIONS

This is a continuation from U.S. patent application Ser. No. 19/000,742 filed Dec. 24, 2024 (now allowed), which was a continuation from U.S. patent application Ser. No. 18/718,461 filed Jun. 11, 2024 (issued as U.S. Pat. No. 12,216,259), which was a 371 application from international patent application PCT/IB2022/060748 filed Nov. 8, 2022, which claims the benefit of priority from U.S. Provisional patent applications Nos. 63/289,323 filed Dec. 14, 2021, 63/297,256 filed Jan. 7, 2022, and 63/380,786 filed Oct. 25, 2022, all of which are incorporated herein by reference in their entirety.

FIELD

The subject matter disclosed herein relates in general to compact mobile cameras and in particular to mobile scanning telephoto ("Tele") cameras.

DEFINITIONS

In this application and for optical and other properties mentioned throughout the description and figures, the following symbols and abbreviations are used, all for terms known in the art:

Lens element: a single lens element.
Lens: assembly of a plurality of lens elements.
Total track length (TTL): the maximal distance, measured along an axis parallel to the optical axis of a lens, between a point of the front surface $S_1$ of a first lens element $L_1$ and an image sensor, when the system is focused to an infinity object distance.
Back focal length (BFL): the minimal distance, measured along an axis parallel to the optical axis of a lens, between a point of the rear surface $S_{2N}$ of the last lens element $L_N$ and an image sensor, when the system is focused to an infinity object distance.
Effective focal length (EFL): in a lens (assembly of lens elements $L_1$ to $L_N$), the distance between a rear principal point P' and a rear focal point F' of the lens.
f-number (f/#): the ratio of the EFL to an entrance pupil (or aperture) diameter of a lens.

BACKGROUND

Mobile electronic handheld devices (or just "mobile devices") such as smartphones having two or more compact cameras (also referred to as "multi-cameras") are known. The two or more cameras have lenses with different effective focal lengths (EFLs) that capture images of a same scene with different fields of view (FOVs). For example, a multi-camera may include a Wide camera having a Wide camera FOV ("$FOV_W$") of e.g. 80 degrees and a Tele (or "zoom") camera having a narrower FOV ("native $FOV_T$" or "n-$FOV_T$") of e.g. 25 degrees and with higher spatial resolution (for example 3-5 times higher) than that of the Wide camera.

Tele cameras with scanning capability ("scanning Tele cameras" or "STCs") for expanding the native fields-of-view n-$FOV_T$ to an effective Tele FOV (also referred to as "scanning $FOV_T$" or "s-$FOV_T$") overcome some of the limitations that relate to narrow n-$FOV_T$s. Compact STCs can be realized in a folded camera such as described for example in co-owned U.S. Pat. No. 10,578,948, or in a double-folded camera such as described for example in co-owned international patent PCT/IB2021/059843. One or two optical path folding elements (OPFEs), for example prisms or mirrors, are rotated along one or two directions to direct (or "scan" or "steer") the n-$FOV_T$ towards arbitrary points of view (POVs) within s-$FOV_T$.

The f-number ("f/#") of a camera lens is the ratio of the EFL to the aperture diameter ("DA"): f/#=EFL/DA. As known in the art, a low f/# is desired as of 3 major advantages: High signal-to-noise ratio (SNR), strong "natural" Bokeh effect and support of high image resolutions. A low f/# is, amongst others, achieved by maximizing the aperture area of the camera lens.

It is noted that herein, "aperture" refers to an entrance pupil of a lens (or "lens assembly"). If it is referred to an "aperture of a camera" or an "aperture of an optical lens system", this always refers to the aperture of the lens included in the camera or in the optical lens system respectively. "Aperture" and "clear aperture" are used interchangeably.

There is need and it would be beneficial to have a compact scanning Tele camera for incorporation in a mobile device that includes a lens having a large aperture area and low f number.

SUMMARY

In various exemplary embodiments (examples), there is provided a scanning Tele cameras (STC) comprising: an OPFE for folding a first optical path OP1 to a second optical path OP2, wherein the OPFE has an OPFE height $H_O$ measured along OP1, an OPFE length $L_O$ measured along an axis parallel to OP, and a light exiting surface; an OPFE actuator; a lens having a lens optical axis parallel to OP2, an EFL, a maximum lens aperture height $H_A$ measured along OP1, and a maximum lens aperture width $W_A$ measured along an axis perpendicular to both OP1 and OP2; and an image sensor having an image sensor diagonal (SD) and an image sensor height $H_{sensor}$ measured along OP1, wherein the STC has a STC native field-of-view (n-$FOV_T$), wherein the OPFE actuator is configured to rotate the OPFE around a first rotation axis perpendicular to both OP1 and OP2 and around a second rotation axis parallel to OP1 for scanning a scene with the n-$FOV_T$, wherein the first rotation axis is located at a distance $\Delta 1$ from the light exiting surface of the OPFE, and wherein $\Delta 1/L_O < 0.25$.

In some examples, $\Delta 1/L_O < 0.2$. In some examples, $\Delta 1/L_O < 0.15$. In some examples, $\Delta 1/L_O < 0.1$. In some examples, $\Delta 1/L_O < 0.075$.

In some examples, the OPFE has an OPFE center with respect to OP1, wherein the first rotation axis is located at a distance $\Delta_C$ from the OPFE center along OP1, and wherein a ratio of $\Delta_C$ and $H_O$ fulfils $\Delta_C/H_O > 0.015$. In some examples, $\Delta_C/H_O > 0.02$.

In some examples, the lens is movable for focusing along OP2.

In some examples, the STC is included in a camera module, wherein the camera module is divided into a module region having a module region height $H_M$ and a shoulder region having a shoulder region height $H_S < H_M$, all heights being measured along OP1, and wherein $H_S < H_A + 3$ mm. In some examples, the OPFE is included in the module region and the lens and the image sensor are included in the shoulder region.

In some examples, the lens is divided into a first lens group (G1) and a second lens group (G2), wherein the OPFE and G1 are included in the module region and G2 and the image sensor are included in the shoulder region.

In some examples, the OPFE has an OPFE center with respect to OP1, wherein the first rotation axis is located at a distance $\Delta_C$ from the OPFE center along OP1, and a ratio of $\Delta_C$ and $H_S$ fulfils $\Delta_C/H_S>0.01$. In some examples, $\Delta_C/H_S>0.015$.

In some examples, $H_S<H_A+2$ mm.

In some examples, $H_S<W_A$.

In some examples, $H_S/H_M<0.9$. In some examples, $H_S/H_M\leq0.8$.

In some examples, $H_A/H_S>0.7$.

In some examples, $H_A/H_M>0.5$.

In some examples, $DA/H_S>0.8$. In some examples, $DA/H_M>0.65$.

In some examples, $H_M<H_O+4$ mm. In some examples, $H_M<H_O+3$ mm.

In some examples, the STC is included in a mobile device, wherein the mobile device has a regular region with a regular thickness T and a bump region with a bump thickness T+B, wherein the shoulder region is included in the mobile device regular region and wherein the module region is included in the mobile device bump region. In some examples, the mobile device may additionally include a Wide camera having a Wide camera image sensor and a Wide camera field-of-view ($FOV_W$). In some examples, the mobile device may be a smartphone.

In some examples, $H_O<H_A+2$ mm. In some examples, $H_O<H_A+1$ mm.

In some examples, SD/EFL>0.4 mm.

In some examples, the STC uses a parallel STC sensor configuration. In some examples, the STC uses an anti-parallel STC sensor configuration.

In some examples, the scanning provides an effective Tele scanning FOV s-$FOV_T$, wherein the s-$FOV_T$ has a longer horizontal side and a shorter vertical side, and wherein a horizontal side H-$FOV_T$ of s-$FOV_T$ is greater than 40 degrees.

In some examples, a center location of s-$FOV_T$ is identical with a center location of $FOV_W$. In some examples, $FOV_W$ is in the range of 50-120 degrees, wherein s-$FOV_T$ covers a 16:9 segment of $FOV_W$. In some examples, $FOV_W$ is in the range of 70-90 degrees, wherein s-$FOV_T$ covers a 16:9 segment of $FOV_W$. In some examples, $FOV_W$ is in the range of 75-85 degrees, wherein s-$FOV_T$ covers a 16:9 segment of $FOV_W$.

In some examples, H-$FOV_T>45$ degrees. In some examples, H-$FOV_T>50$ degrees.

In some examples, s-$FOV_T$ has a longer horizontal side and a shorter vertical side, and a vertical side V-$FOV_T$ of s-$FOV_T$ is greater than 20 degrees. In some examples, V-$FOV_T>25$ degrees. In some examples, V-$FOV_T>30$ degrees.

In some examples, the rotation of the OPFE along the first rotation axis is by more than ±5 degrees around a zero scan position. In some examples, the rotation of the OPFE along the second rotation axis is by more than ±15 degrees around a zero scan position.

In some examples, the OPFE is a prism. In some examples in which the OPFE is a prism, the prism has a fast scanning axis and a slow scanning axis, wherein the image sensor is oriented such that the prism's fast scanning axis is aligned with the horizontal side H-$FOV_T$ of S-$FOV_T$.

In some examples, the STC has an EFL of 8-10 mm. In some examples, the STC has an EFL of 10-25 mm. In some examples, the STC has an EFL of 25-50 mm.

In some examples, the OPFE actuator is a voice coil motor. In some examples, the lens has a f number f/#, wherein f/#<3.5. In some examples, f/#<3. In some examples, f/#<2.5. In some examples, a distance between the OPFE and the lens is $\Delta L_O$, and $\Delta L_O/TTL<0.25$.

In some examples, $H_O/L_O<0.9$. In some examples, $W_O/H_O>1.5$. In some examples, $W_O/H_O>1.75$.

In some examples, the lens is a cut lens and the cut is performed along an axis parallel to OP2. In some examples, the cut lens is cut by 10%-50%. In some examples, the cut lens is cut by X %, wherein the cutting by X % reduces $MH_M$ and $MH_S$ by 0.5·X %–X %.

In some examples, the OPFE is a cut OPFE and the cut is performed along an axis parallel to OP2. In some examples, the cut OPFE is cut by 10%-40%. In some examples, the cut OPFE has a cut surface that extends along a distance $\Delta cut$ from the OPFE light exiting surface, wherein $\Delta cut>41$.

In some examples, the lens elements in the lens have an average lens thickness (ALT), the thickness of the first lens element $L_1$ being T1, and T1/ALT>1.5.

In some examples, the lens elements in G1 have an ALT of $ALT_{G1}$, and $ALT_{G1}/ALT>1.25$.

In some examples, the lens elements in G2 have an ALT of $ALT_{G2}$, and $ALT_{G1}/ALT_{G2}>2$.

In some examples, the focal length of the first lens element is f1 and f1/EFL<0.75. In some examples, a ratio of the height of G1 and the height of G2 is $H_{G1}/H_{G2}>1.15$.

In some examples, $H_{G1}/H_{G2}>1.3$.

In some examples, the first lens element L1 is made of glass.

In some examples in which the OPFE is a prism, the prism includes a stray light prevention mechanism. In some examples, the stray light prevention mechanism includes two stray light masks located at the light entering surface and two stray light masks located at the light exiting surface. In some examples, the two stray light masks located at the light entering surface are located at a left margin and at a right margin of the light entering surface, and wherein the two stray light masks located at the light exiting surface are located at a top and at a bottom of the light exiting surface. In some examples, the two stray light masks located at the light entering surface together cover a surface area of more than 10% and less than 20% of the area of the light entering surface. In some examples, the two stray light masks located at the light exiting surface together cover a surface area of more than 20% and less than 30% of the area of the light exiting surface.

In some examples there is provided a mobile device comprising an STC as above or below, together with an application processor (AP). In some examples, in a mobile device that includes a Wide camera, the AP is configured to use image data from the Wide camera for autonomous scanning of a scene with the STC's n-$FOV_T$. In some examples, the AP is configured to scan a scene with the STC's n-$FOV_T$ according to a user input.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals. Elements in the drawings are not necessarily drawn to scale.

FIGS. 1A-1D show known dual cameras including a folded STC included in a mobile device;

FIG. 1E shows an OPFE of a known STC as in FIGS. 1A-1D in a zero scan position in a cross-sectional view;

DETAILED DESCRIPTION

Figure 2A:
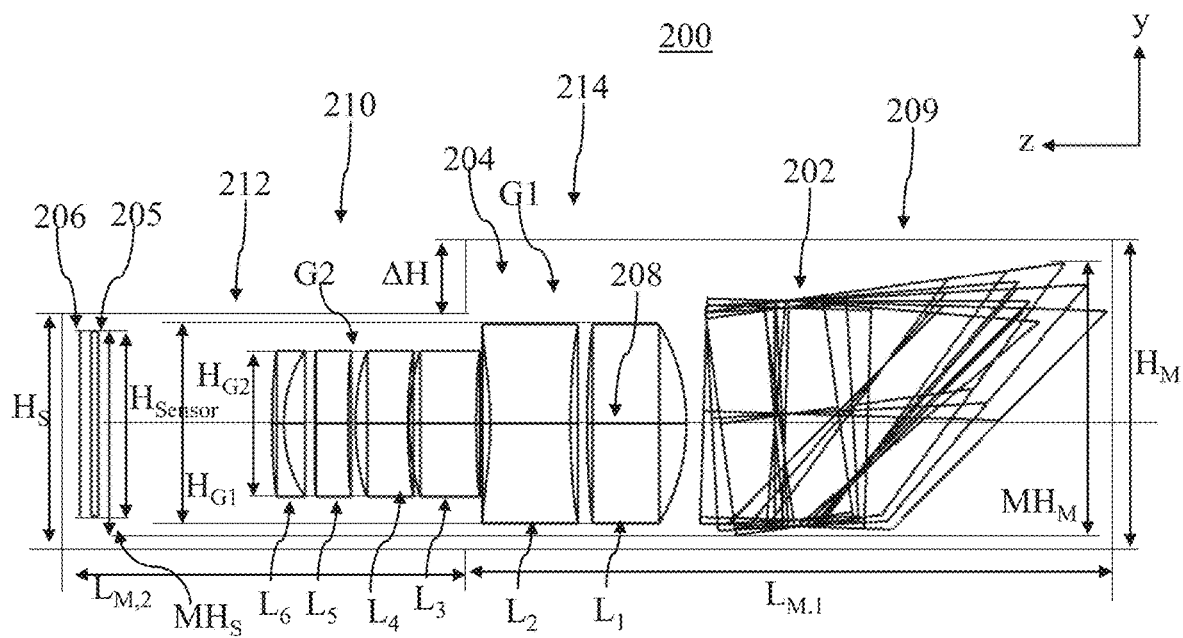
FIG. 2A shows a folded STC disclosed herein in a cross-sectional view.

FIG. 1A illustrates a known folded scanning Tele camera ("folded STC") 100 comprising an optical path folding element (OPFE) 102, a lens 104 including a plurality of lens elements (not shown), lens 104 being included in a lens barrel 110, and an image sensor 106. Lens 104 has an optical lens height $H_L$, measured along OP 112. $H_L$ defines an aperture diameter (DA) of lens 104 in the y-direction. OPFE 102 folds an optical path (OP) from a first OP 112 (parallel with the y-axis in the YZ coordinate system shown) to a second OP 108 parallel with an optical axis of lens 104 along the z axis in the coordinate system shown. A theoretical limit for a height of a camera module ("minimum module height" or "$MH_M$") and a theoretical limit for a length of a camera module ("minimum module length" or "$ML_M$") including camera 100 is shown. $MH_M$ and $ML_M$ are defined by the largest dimension along OP 112 and along OP 108 of a component included in camera 100 respectively. For scanning a scene with STC 100's n-$FOV_T$, OPFE 102 may be rotated around two axes, a first rotation axis being parallel to the y-axis, and a second rotation axis being parallel to the x-axis.

FIG. 1B illustrates a known dual-camera 150 that comprises STC 100 and a (vertical or upright) Wide camera 130 including a Wide lens 132 and a Wide image sensor 138. Lens 132 is included in a lens barrel 134. Wide camera 130 has an OP 136 which is substantially parallel with OP 112.

FIG. 1C shows schematically a known mobile device 160 (e.g. a smartphone) having an exterior rear surface 162 and including known STC 100 in a cross-sectional view. The aperture of STC 100 is located at rear surface 162, a front surface 166 may e.g. include a screen (not visible). Mobile device 160 has a regular region of thickness ("T") and a camera bump region 164 that is elevated by a height B over the regular region. The bump region has a bump length ("$L_B$") and a bump thickness T+B. As shown, STC 100 is entirely integrated in the bump region, such that MML and MMH define a lower limit for the bump region, i.e. for $L_B$ and T+B. For industrial design reasons, a small camera bump (i.e. a short $L_B$) is desired. Mobile device 160 may additionally include an application processor (AP—not shown). In some examples, the AP may be configured to scan a scene with STC 100's n-$FOV_T$ according to a user input. In other examples, the AP may be configured to use image data from a Wide camera such as camera 130 to autonomously scan a scene with STC 100's n-$FOV_T$.

FIG. 1D shows a known cut lens element 180 in a cross-sectional view. Lens element 180 is cut by 20%, i.e. 180's optical width $W_L$ is 20% larger than its optical height $H_L$. This means that also the aperture changes accordingly, such that the aperture is not axial symmetric. The cutting allows for a small $H_L$, which is required for small $MH_M$s (see FIG. 1A), and still relatively large effective aperture diameters (DAs) which satisfy DA>$H_L$.

FIG. 1E shows OPFE 102 of known STC 100 in a zero scan position in a cross-sectional view. Here, OPFE 102 is a prism having a light entering surface 190 and a light exiting surface 191. In the zero scan position, OPFE 102 has a length $L_O$ (measured along the z-axis) and a height $H_O$ (measured along the y-axis). The location of a first rotation axis 192 for rotating OPFE 102 around an axis perpendicular to the shown y-z-coordinate system (and as indicated by arrow 193) and a second rotation axis 194 for rotating OPFE 102 around an axis parallel to the axis (and as indicated by arrow 195) are shown. A distance from first rotation axis 192 to OPFE 102's light exiting surface 191 is marked Δ192. A distance from second rotation axis 194 to OPFE 102's light entering surface 190 is marked Δ194. In a known STC, both rotation axes are located in a center region of OPFE 102, i.e. a ratio between Δ192 and $L_O$ and between Δ194 and $H_O$ respectively is about 0.5. Specifically, Δ192/$L_O$ and Δ194/$H_O$ in general satisfy Δ192/$L_O$=0.3-0.7 and Δ194/$H_O$=0.3-0.7.

In the following, a "first rotation axis" of a prism indicates the rotation axis that does neither intercept with the light entering surface nor with the light exiting surface of a prism and which is parallel to both the light entering surface nor with the light exiting surface of a prism, as for example first rotation axis 192. A "second rotation axis" of a prism indicates the rotation axis that intercepts with the light entering surface a prism and which is parallel to the light exiting surface of a prism, as for example second rotation axis 194. It is noted that the first rotation axis as defined above represents a "fast scan axis" (or "efficient scan axis") of a STC, as for each degree of rotational movement of a prism around the first rotation axis, s-$FOV_T$ moves by two degrees. The second rotation axis as defined above represents a "slow scan axis" (or "inefficient scan axis") of a STC, as for each degree of rotational movement of a prism around the second rotation axis, s-$FOV_T$ moves by one degree.

In all examples disclosed herein, the OPFE is a prism having a light entering surface, a light reflecting surface and a light exiting surface. Therefore, we may use "OPFE" and "prism" interchangeably. However, this is not limiting, and in other examples a mirror having a light entering surface may be used.

Figure 2B:
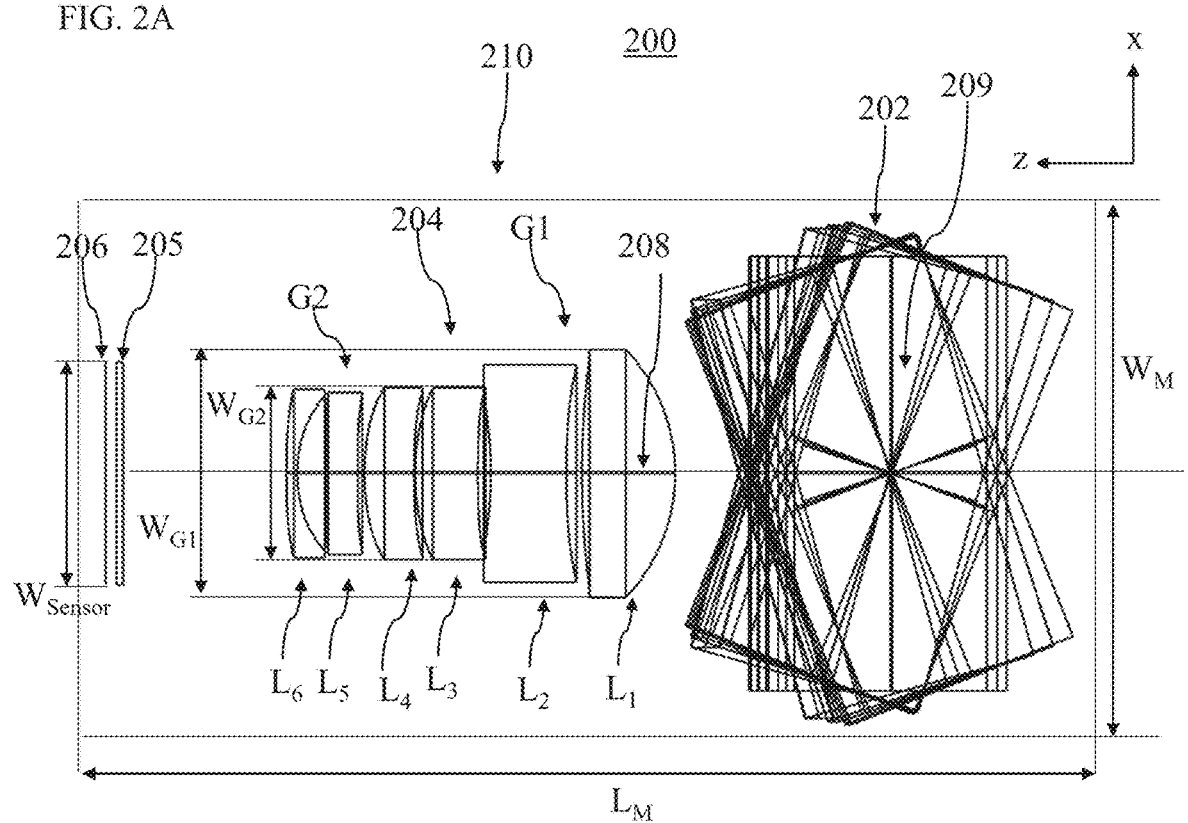
FIG. 2B shows a folded STC disclosed herein in a top view.

FIG. 2A shows a STC disclosed herein and numbered 200 in a cross-sectional view. STC 200 includes an OPFE 202 (e.g. a prism or a mirror), a lens 204 including N=6 lens elements $L_1$-$L_6$, an (optional) optical filter 205 and an image sensor 206. FIG. 2B shows STC 200 in a top view.

Lens 204 has an optical axis 208. STC 200 has an aperture 209. STC 200 includes a camera module housing 210. Module housing 210 has a module region 214 having a module height ("$H_M$") as well as a module length $L_{M,1}$ and a shoulder region 212 having a shoulder height ("$H_S$") that is lower by ΔH than module region 214, i.e. $H_M$>$H_S$, as well as a shoulder length $L_{M,2}$. Here and in the following, all widths ("W") are measured along an axis parallel to the x-axis, all heights ("H") are measured along an axis parallel to the y-axis, all lengths ("L") are measured along an axis parallel to the z-axis.

A theoretical limit for a module height of camera 200 is "minimum module height" (or "$MH_M$"). A theoretical limit for a shoulder height of camera 200 is "minimum shoulder height" (or "$MH_S$"). $MH_M$ and $MH_S$ respectively are defined by the largest height dimension of a component included in STC 200. $MH_M$ is defined by OPFE 202's height $H_O$ plus an additional height required for rotating OPFE 202, as shown. In all STCs disclosed herein, a relatively low $MH_M$ is achieved by making the two following design choices:

1. By locating or positioning a first OPFE rotation axis such as 402, 452 and 1306 (see FIGS. 13A-13B) relatively close to the light exiting surface of an OPFE, i.e. by relatively small ratios of Δ402/$L_O$, Δ452/$L_O$ and Δ1306/$L_P$ which are smaller than 0.25.
2. Using an OPFE such as OPFE 202, OPFE 252 and OPFE 1102 that fulfill $H_O$<$L_O$.

$MH_S$ is defined by image sensor 206's height ("$H_{sensor}$") plus an additional height required for rotating OPFE 202. Small $MH_M$ and $MH_S$ are beneficial for incorporating in slim mobile devices such as smartphones and tablets.

To clarify, all camera modules and optical lens systems disclosed herein are beneficially for use in mobile devices such as smartphones, tablets etc.

For achieving realistic estimations, we calculate $H_M$ and $H_S$ respectively by adding an additional height penalty of 1.5 mm to $MH_M$ or $MH_S$, i.e. $H_M$=$MH_M$+1.5 mm and $H_S$=$MH_S$+1.5 mm. The penalty accounts for movements that may be required for optical image stabilization (OIS), autofocusing (AF) as well as housing, lens cover etc. Note that the value of 1.5 mm is exemplary and by no means limiting, and that the addition may vary between 1 and 3 mm.

Lens 204 is divided in two lens groups, a first lens group ("G1") including L1 and L2 and a second lens group ("G2") including L3-L6. G1 has a maximal optical lens height $H_{G1}$ and G2 has a maximal optical lens height $H_{G2}$, wherein $H_{G1}$>$H_{G2}$. G1 may be included in the module region 214 and G2 may be included in the shoulder region 212. G1 has a maximal optical lens width $W_{G1}$ and G2 has a maximal optical lens width $W_{G2}$, wherein $W_{G1}$>$W_{G2}$ (FIG. 2B). Also OPFE 202 may be included in module region 214, and optical filter 205 and image sensor 206 may be included in shoulder region 212. In other embodiments, entire lens 204 (i.e. both G1 and G2) may be included in shoulder region 212. This may be beneficial for integrating STC 200 in a slim mobile device, i.e. a mobile device having a low height. A large $H_{G1}$ may be desired, as it allows STC 200 to have a large DA. A small $H_{G2}$ may be desired, as it allows STC 200 to have a slim shoulder region 214, i.e. small $H_S$.

For scanning a scanning Tele FOV ("s-$FOV_T$") with STC 200's native $FOV_T$ ("n-$FOV_T$"), OPFE 202 is rotated along two dimensions. OPFE 202 is shown in several rotation states which are required for scanning s-$FOV_T$. The rotation for scanning s-FOV may be actuated by a voice coil motor (VCM). OPFE 202 is a cut (or "D-cut") prism.

Figure 2C:
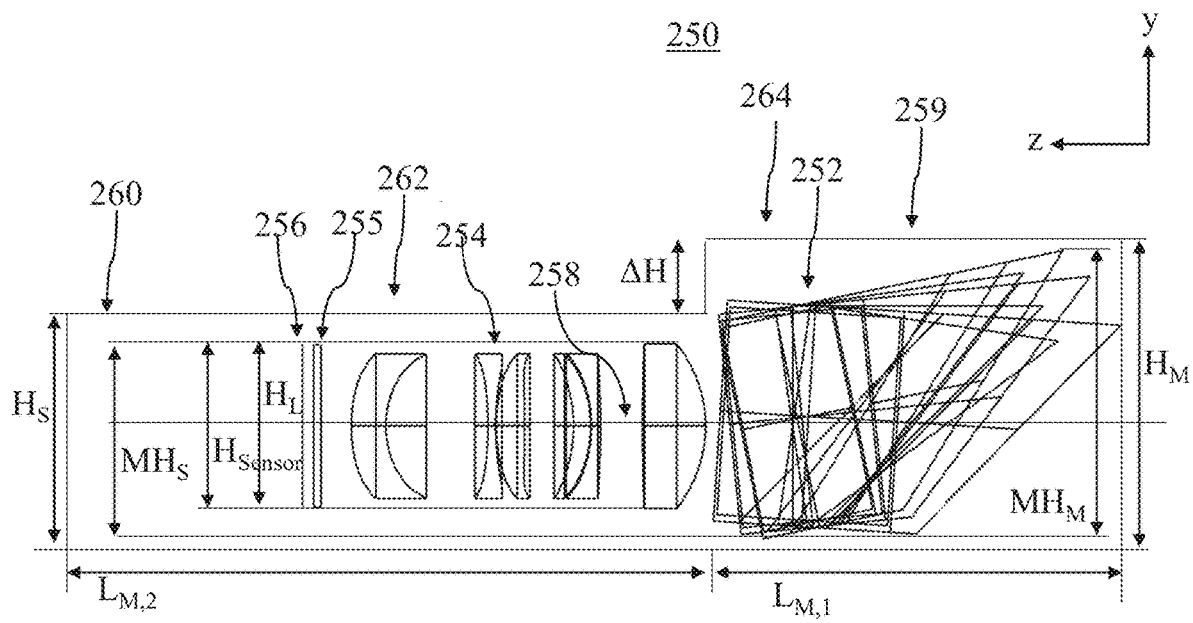
FIG. 2C shows another folded STC disclosed herein in a cross-sectional view.

FIG. 2C shows another STC disclosed herein and numbered 250 in a cross-sectional view.

Figure 2D:
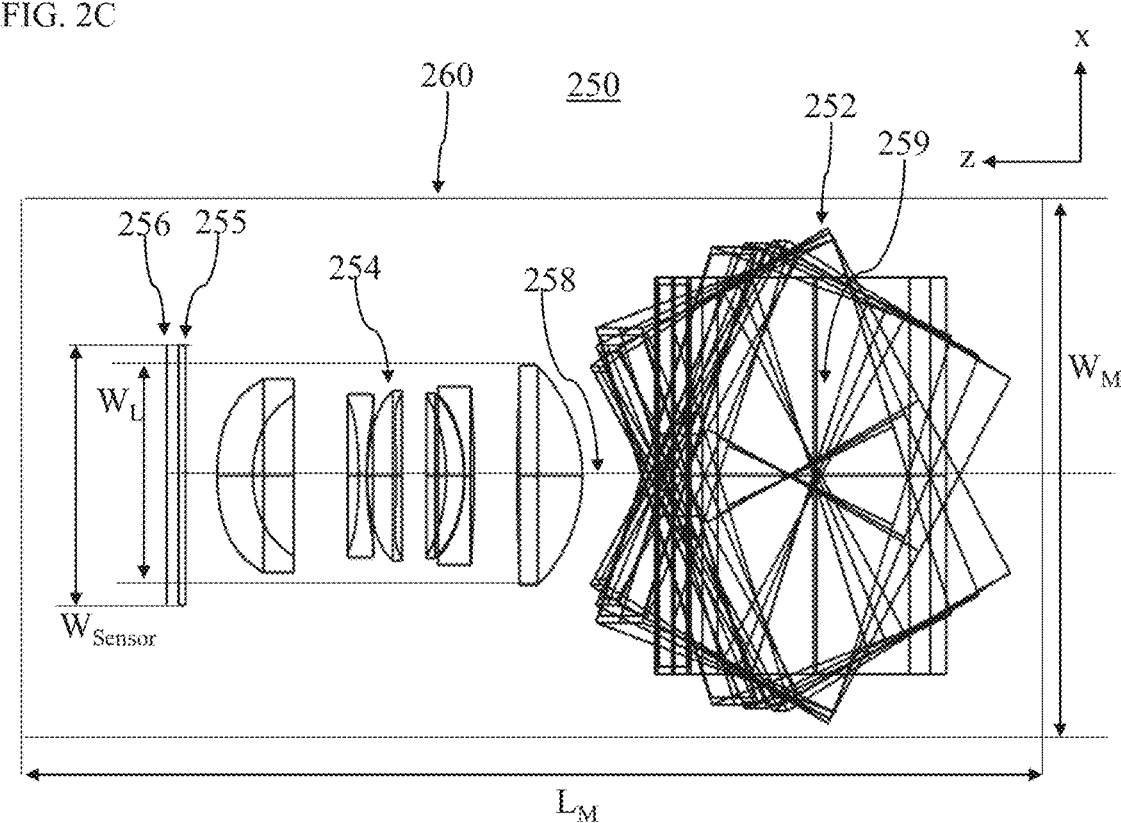
FIG. 2D shows another folded STC disclosed herein in a top view.

FIG. 2D shows STC 250 in a top view. STC 250 includes an OPFE 252 (e.g. a prism or a mirror), a lens 254 including N=6 lens elements $L_1$-$L_6$, an (optional) optical filter 255 and an image sensor 256. OPFE 252 is shown in several rotation states which are required for scanning s-$FOV_T$. OPFE 252 is a cut (or "D-cut") prism.

Lens 254 is a cut lens. Lens 254 has an optical axis 258, an optical lens height $H_L$ and an optical lens width $W_L$. STC 250 has an aperture 259. STC 250 includes a camera module housing 260. Module housing 260 has a module region 264 with module height $H_M$ as well as a module region length $L_{M,1}$ and a shoulder region 262 having shoulder height $H_S$ that is lower by ΔH than $H_M$, i.e. $H_M$>$H_S$, as well as a shoulder region length $L_{M,2}$. For industrial design reasons, it is beneficial to minimize $L_{M,1}$, as it allows for mobile devices with a small $L_B$ (FIG. 3B).

A theoretical limit for a module height and a shoulder height of STC 250 is $MH_M$ and $MH_S$ respectively, as defined above. $H_M$ and $H_S$ are calculated respectively by adding a penalty 1.5 mm to $MH_M$ or $MH_S$, i.e. $H_M$=$MH_M$+1.5 mm and $H_S$=$MH_S$+1.5 mm.

Lens 254 is fully included in shoulder region 262. OPFE 252 is included in module region 264. Optical filter 255 and image sensor 256 are included in shoulder region 262.

In other examples, one or more of the first lens elements may be included in module region 264. For lens 254, $L_1$, which has a larger height $H_{L1}$ than all other lens elements, may be included in module region 264.

Figure 3A:
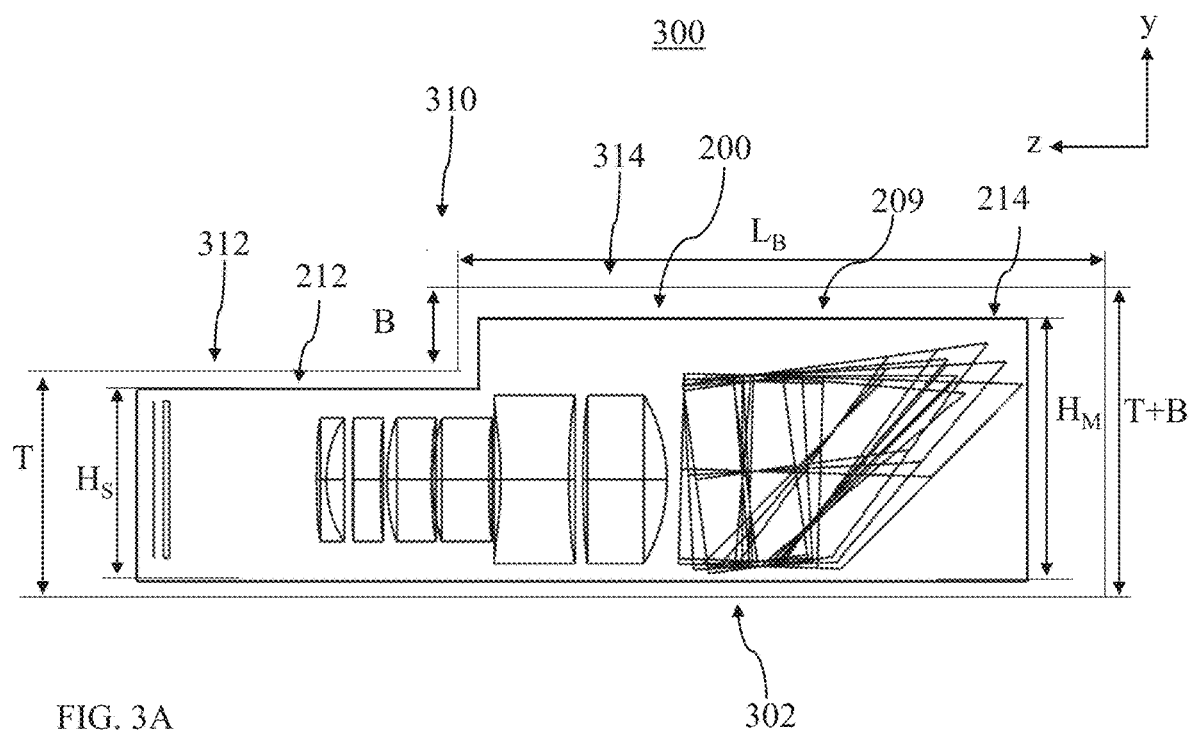
FIG. 3A shows a mobile device including the folded STC from FIGS. 2A-B in a cross-sectional view.
Figure 3B:
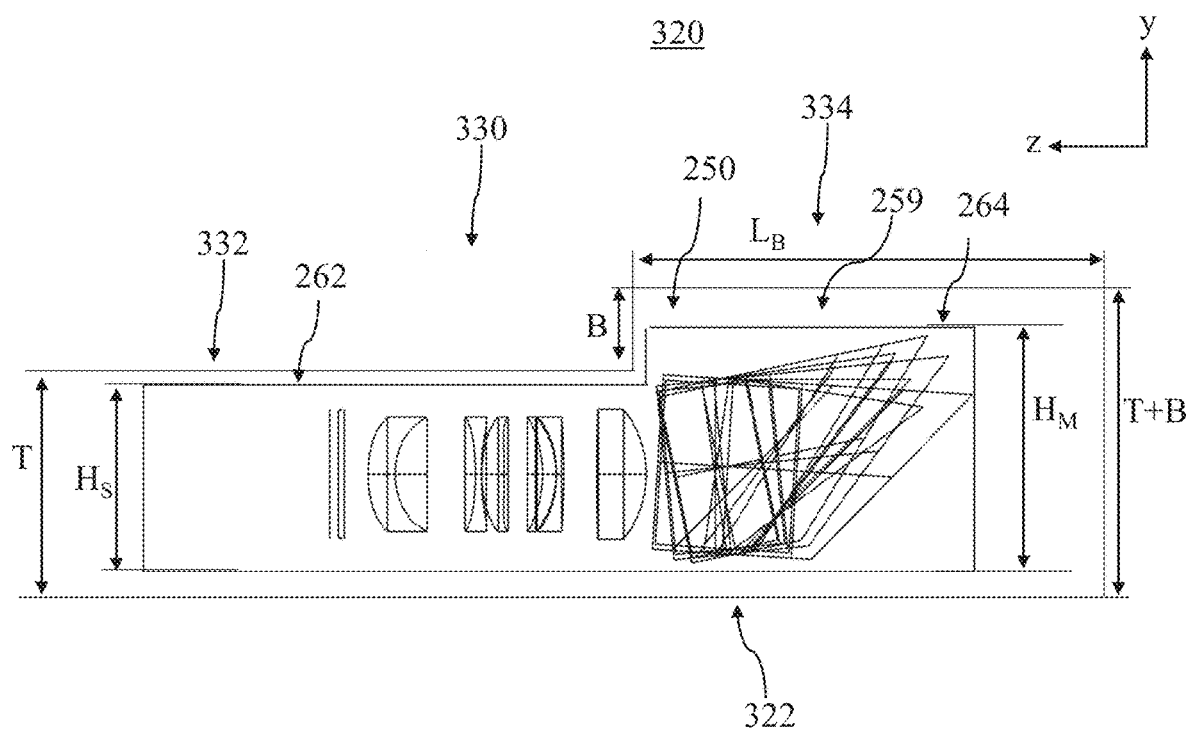
FIG. 3B shows another mobile device including the folded STC from FIGS. 2C-D in a cross-sectional view.

FIG. 3A shows a mobile device 300 (e.g. a smartphone) including STC 200 from FIGS. 2A-B in a cross-sectional view. Mobile device 300 has a front surface 302 (e.g.

including a screen, not shown) and a rear surface 310 including STC 200's aperture 209. Mobile device 300 has a regular region 312 of thickness "T" and a camera bump region 314 that is elevated (protrudes outwardly) by a height B over regular region 312. The bump region has a bump length ("$L_B$") and a bump thickness T+B. From an industrial design point of view, it is desired to minimize a bump area, i.e. to have a short $L_B$. For achieving short $L_B$, module region 214 of STC 200 is included in bump region 314 and shoulder region 212 of STC 200 is included in regular region 312. This means that OPFE 202 and G1 of lens 204 are included in bump region 314, and G2 of lens 204 and image sensor 206 are included in regular region 312.

Optionally, in some embodiments (also referred to as "examples"), parts of shoulder region 212 may also be included in bump region 314. In other embodiments, both G1 and G2 of lens 204, i.e. the entire lens 204, are included in bump region 314.

FIG. 3B shows a mobile device numbered 320 (e.g. a smartphone) including STC 250 from FIGS. 2C-D in a cross-sectional view. Mobile device 320 has a front surface 322 (e.g. including a screen, not shown) and a rear surface 330 including STC 250's aperture 259. Mobile device 320 has a regular region 332 of thickness "T" and a camera bump region 334 that is elevated by a height B over regular region 332 and has a bump region length $L_B$. For achieving short $L_B$, module region 264 of STC 250 is included in bump region 334 and shoulder region 262 of STC 250 is included in regular region 332. OPFE 252 is included in bump region 334 and lens 254 and image sensor 256 are included in regular region 332. Mobile devices 300 and 320 may additionally include a Wide camera such as Wide camera 130 providing Wide camera images and an application processor (AP). In some examples, the AP may be configured to use Wide camera images to analyze a scene, and, based on the scene analysis, to scan the scene with STC 200's and STC 250's n-$FOV_T$ autonomously. In other examples, the AP may be configured to scan a scene with STC 200's and STC 250's n-$FOV_T$ based on a user's input. A FOV of the Wide camera ("$FOV_W$") may be in the range of 50 degrees-120 degrees or more, e.g. 80 degrees. In a zero scan position, a center position of n-$FOV_T$ coincides with a center position of $FOV_W$. A center position of s-$FOV_T$ coincides with a center position of $FOV_W$. In some examples, s-FOV-covers a 16:9 segment of $FOV_W$.

Figure 3C:
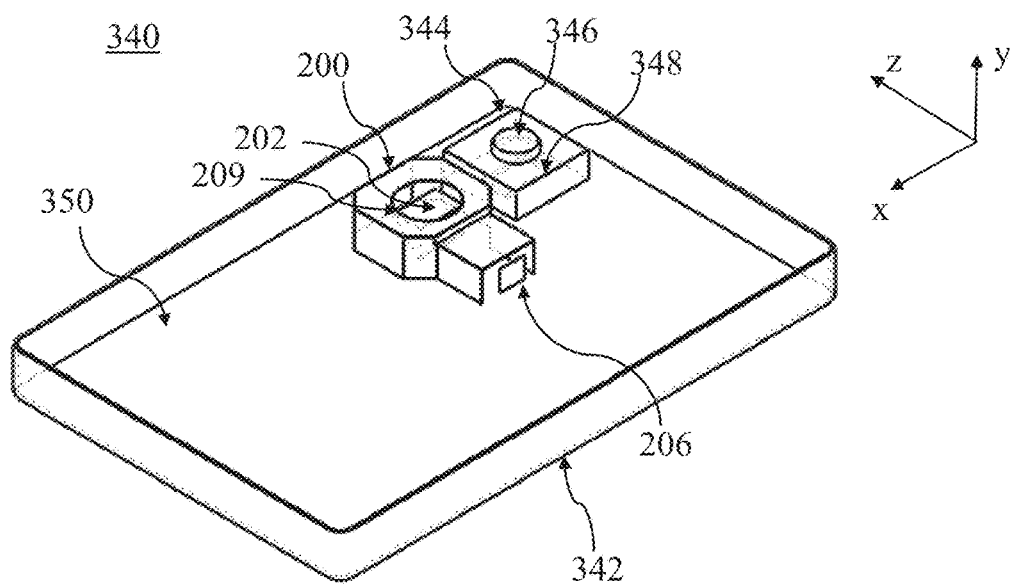
FIG. 3C shows yet another mobile device including a folded camera of FIGS. 2A-D and a Wide camera in a perspective view.
Figure 3D:
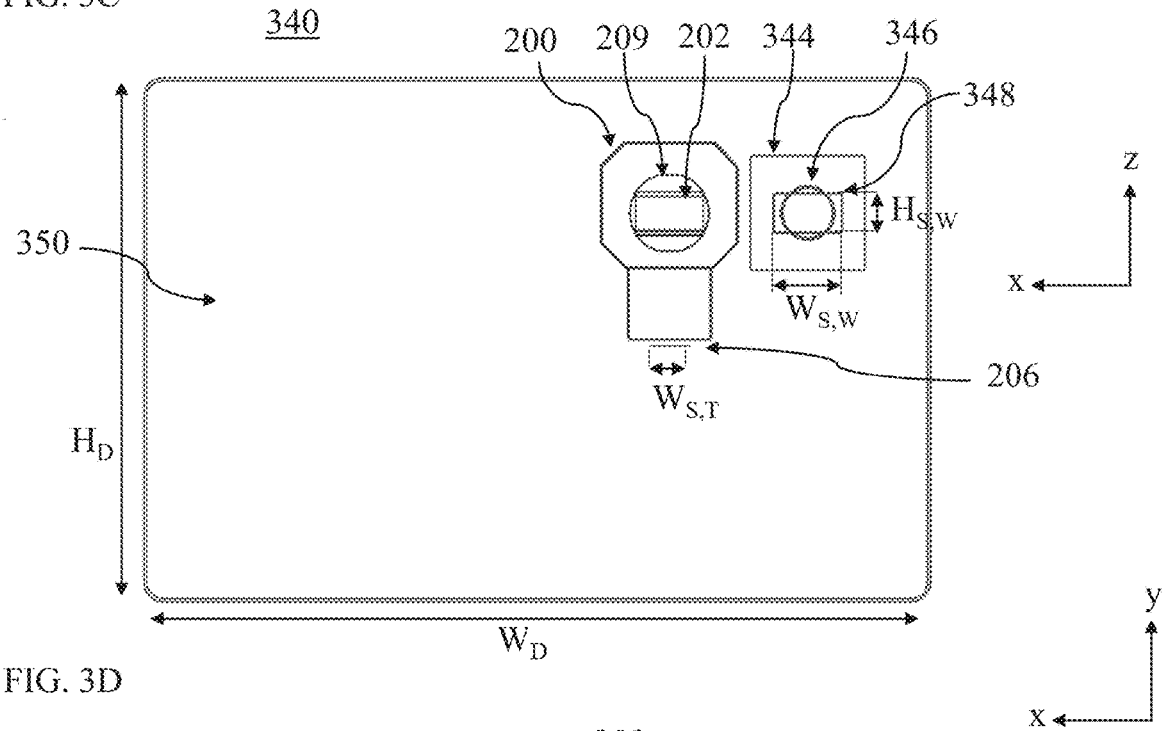
FIG. 3D shows the mobile device of FIG. 3C in a top view.
Figure 3E:
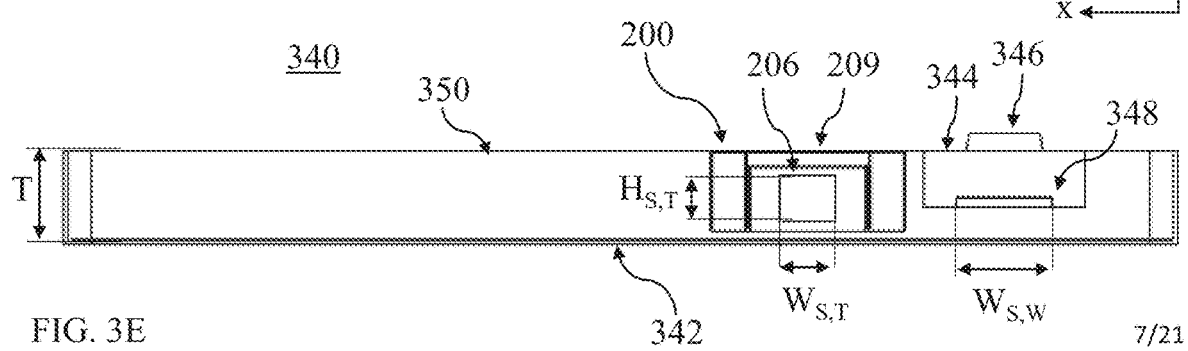
FIG. 3E shows the mobile device of FIG. 3C in a side view.

FIGS. 3C-E show another mobile device numbered 340 (e.g. a smartphone) including a STC such as STC 200 from FIGS. 2A-B or STC 250 from FIGS. 2C-D, as well as a Wide camera 344. In the following and exemplarily, we refer to STC 200 only. FIG. 3C shows mobile device 340 in a perspective view. FIG. 3D shows mobile device 340 in a top view. FIG. 3E shows mobile device 340 in a side view. Wide camera 344 has a Wide camera lens (not shown), a Wide camera aperture 346 and a Wide camera image sensor 348. Mobile device 340 has a front surface 342 (e.g. including a screen, not shown) and a rear surface 350 including the apertures of the STC and Wide camera 344. When considered in top view (FIG. 3D), mobile device 340 has a rectangular shape and a device width "$W_D$" measured along the x-axis as well as a device height "$H_D$" measured along the z-axis, as shown. A ratio of $W_D$:$H_D$ is in general different from 1:1, and may be 16:9, 19:9 or similar. That is, in general $W_D$>$H_D$. Both image sensor 206 and image sensor 348 have a rectangular shape. In the following, a respective width and height of an image sensor is defined as follows: a width of an image sensor represents (or indicates) a largest dimension of the image sensor, and a height of an image sensor represents a second largest dimension of the image sensor. STC 200's image sensor 206 has a Tele sensor width ("$W_{S,T}$") measured along the x-axis and a Tele sensor height ("$H_S$, +") measured along the y-axis, as shown. Wide camera 344's image sensor 348 has a Wide sensor width ("$W_{S,W}$") measured along the x-axis and a Wide sensor height ("$H_{S,W}$") measured along the z-axis, as shown. In general, Wide camera 344 is integrated into mobile device 340 such that $W_{S,W}$ is substantially parallel to $W_D$. For both image sensors, a ratio of $W_S$:$H_S$ is in general different from 1:1, and may be 4:3, 16:9 or similar. That is, in general $W_S$>$H_S$. Image sensor 206 and image sensor 348 may or may not have an identical ratio of $W_S$:$H_S$. In mobile device 340, STC 200 is integrated into mobile device 340 such that $W_S$, is substantially parallel to both $W_{S,W}$ and $W_D$. $H_{S,T}$ is substantially perpendicular to $H_{S,W}$. When considering this incorporation of STC 200 into mobile device 340 in a side view, image sensor 206 is oriented parallel to mobile device 340 (i.e. the rectangular shape of image sensor 206 is oriented parallel to the rectangular shape of mobile device 340). Therefore, in the following we refer to this configuration as "parallel STC sensor configuration".

Figure 3F:
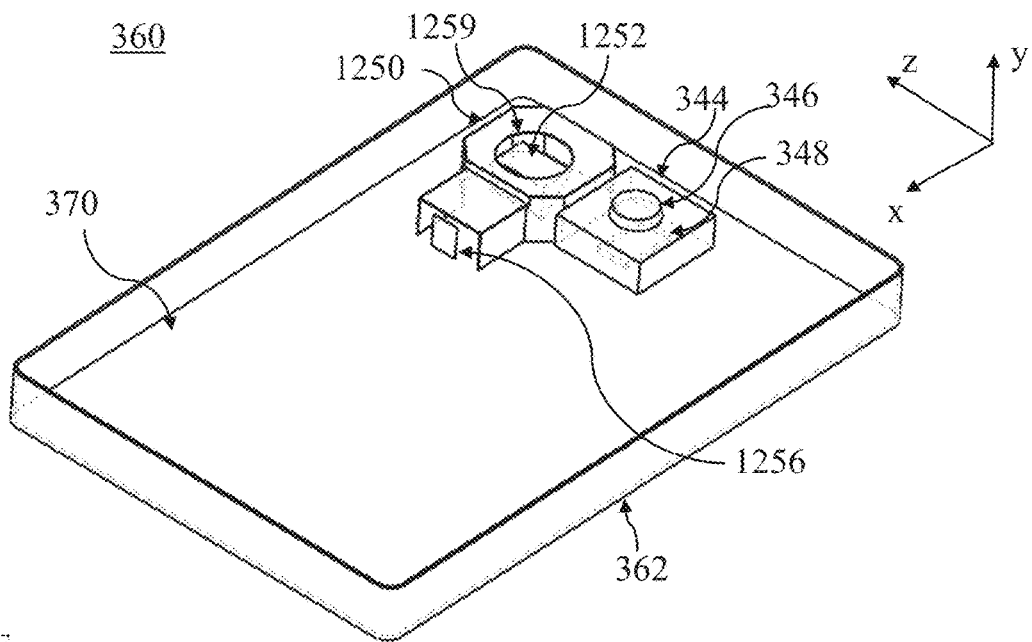
FIG. 3F shows yet another mobile device including a STC disclosed herein as well as a Wide camera.
Figure 3G:
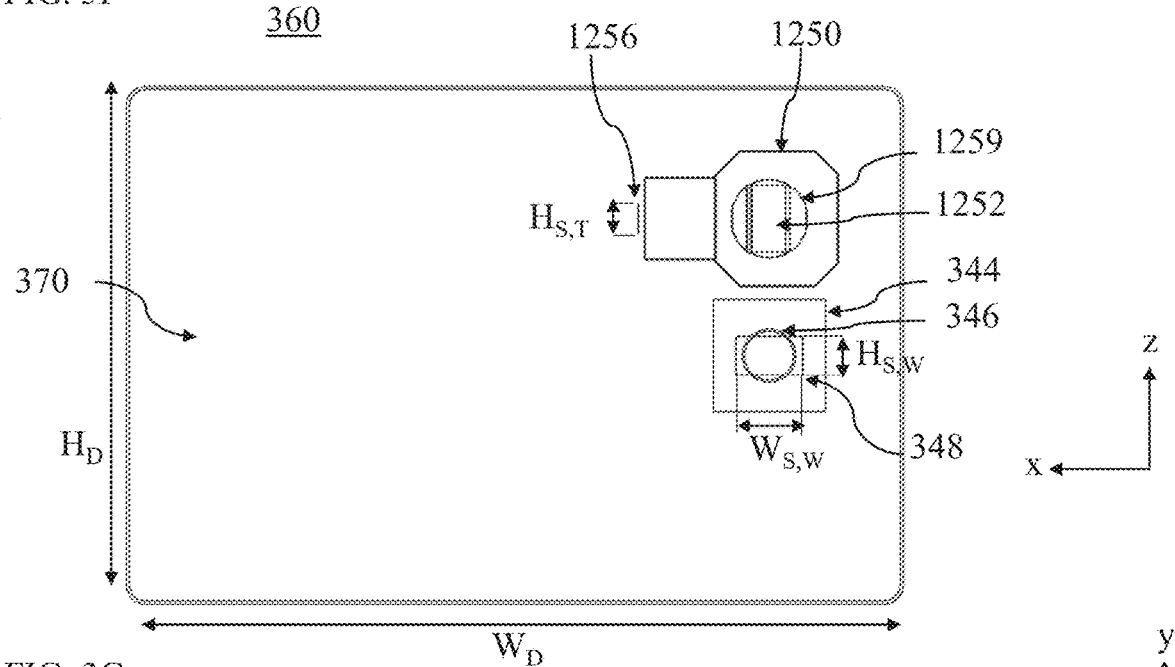
FIG. 3G shows the mobile device if FIG. 3F in a top view.
Figure 3H:
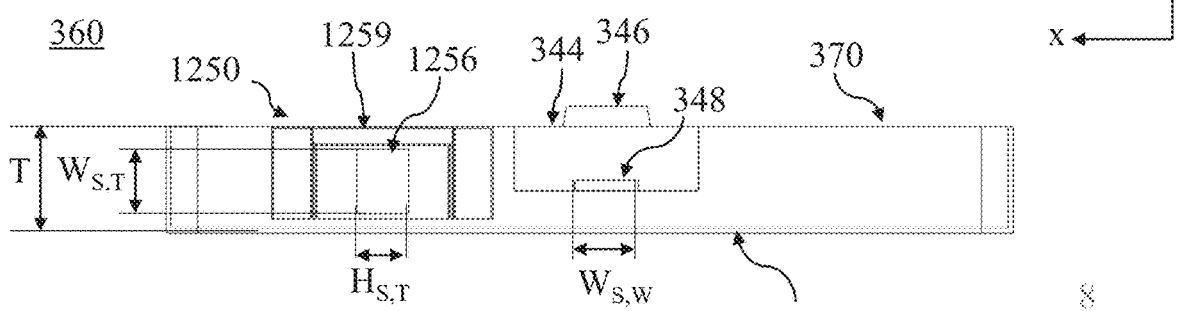
FIG. 3H shows the mobile device if FIG. 3F in a side view.

FIGS. 3F-H show yet another mobile device numbered 360 (e.g. a smartphone) including a STC 1250 as well as a Wide camera 344. STC 1250 includes an optical lens system such as optical lens system 1100 (see FIG. 11) including an OPFE 1102, a lens (not shown) and an image sensor 1106. FIG. 3F shows mobile device 360 in a perspective view. FIG. 3G shows mobile device 360 in a top view. FIG. 3H shows mobile device 360 in a side view. Mobile device 360 has a front surface 362 and a rear surface 370 including the apertures of STC 1250 and Wide camera 344. Mobile device 360 has a device width "$W_D$" measured along the x-axis as well as a device height "$H_D$" measured along the z-axis, as shown. Both image sensor 1106 and image sensor 348 have a rectangular shape. STC 1250's image sensor 1106 has a Tele sensor width ("$W_{S,T}$") measured along the y-axis and a Tele sensor height ("$H_{S,T}$") measured along the x-axis, as shown. Wide camera 344's image sensor 348 has a Wide sensor width ("$W_{S,W}$") measured along the x-axis and a Wide sensor height ("$H_{S,W}$") measured along the z-axis, as shown. In general, Wide camera 344 is integrated into mobile device 340 such that $W_{S,W}$ is substantially parallel to $W_D$. For both image sensors, a ratio of $W_S$:$H_S$ is in general different from 1:1, and may be 4:3, 16:9 or similar. Image sensor 1106 and image sensor 348 may or may not have an identical ratio of $W_S$:$H_S$. In mobile device 360, STC 1250 is integrated into mobile device 360 such that $W_{S,T}$ is substantially perpendicular to both $W_{S,W}$ and $W_D$, which are parallel to each other. $H_{S,T}$ is substantially perpendicular to $H_{S,W}$ substantially parallel to $W_{S,W}$. When considering this incorporation of STC 1300 into mobile device 360 in a side view, image sensor 1106 is oriented anti-parallel to mobile device 360 (i.e. the rectangular shape of image sensor 1106 is oriented anti-parallel to the rectangular shape of mobile device 360). Therefore, in the following we refer to this configuration as "anti-parallel STC sensor configuration".

Figure 4A:
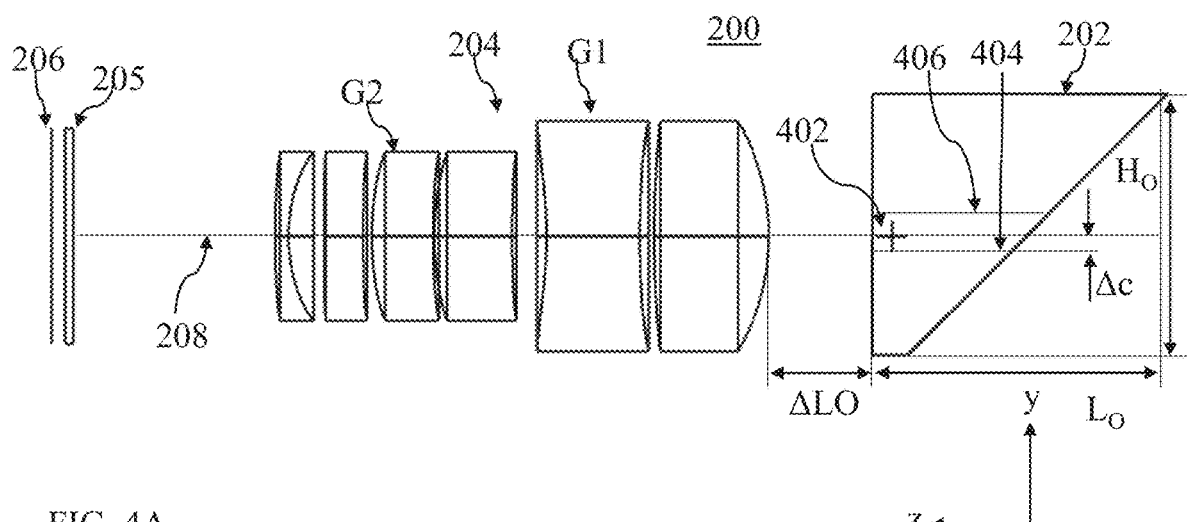
FIGS. 4A-4C show the folded STC from FIGS. 2A-B at different scan states around a first rotation axis in a cross-sectional view.

FIG. 4A shows STC 200 from FIGS. 2A-B without module housing 210 in a zero scan position in a cross-sectional view. The zero scan position is defined by OPFE 202's top surface being parallel with the z-axis such that n-$FOV_T$ is located at the center of s-$FOV_T$. OPFE 202 is rotated around a first rotation axis 402 which is parallel to the x-axis (i.e. perpendicular to both the y-axis and the z-axis shown). Non-cut center axis 404 indicates a center of a non-cut OPFE 202 with respect to the y-axis, i.e. if OPFE 202 was not cut, non-cut center axis 404 would be located at the center of the non-cut OPFE. Cut center axis 406 indicates a center of cut OPFE 202 with respect to the y-axis, i.e. cut center axis 406 is located at the center of cut OPFE 202. As visible, first rotation axis 402 intersects with the optical axis 208 of lens 204. However, first rotation axis 402 does not intersect with non-cut center axis 404 nor with cut center axis 406. First rotation axis 402 is located at distance ΔC from non-cut center axis 404. This de-center location with respect to the y-axis of OPFE 202 is beneficial for minimizing $MH_M$. Image sensor 206 is oriented in a parallel STC sensor configuration.

Figure 4B:
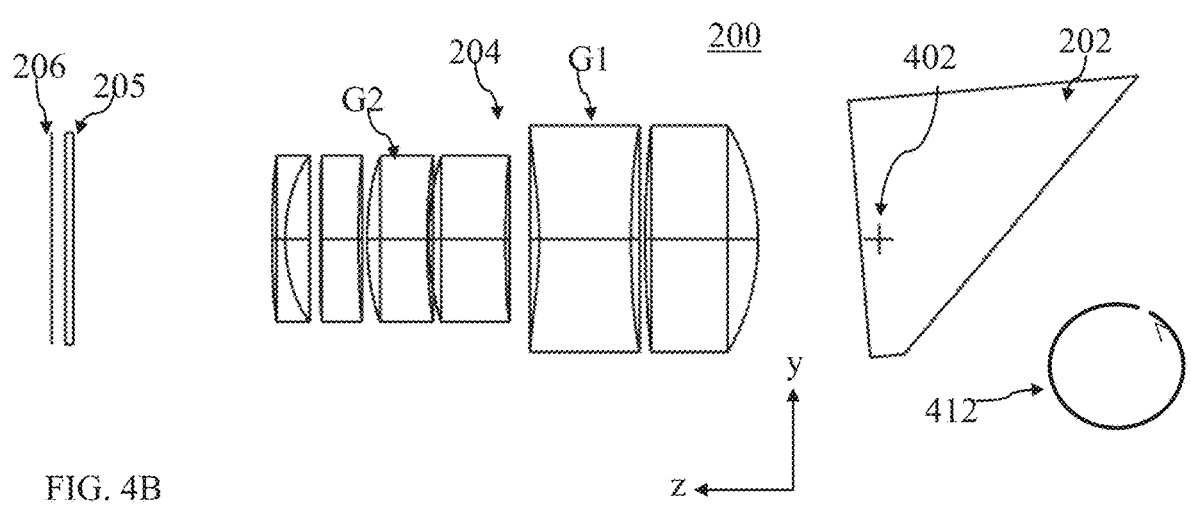

FIG. 4B shows STC 200 without module housing 210 from FIG. 4A in a maximal counter-clockwise rotation state with respect to the first rotation axis 402. The counter-clockwise rotation direction 412 is shown.

Figure 4C:
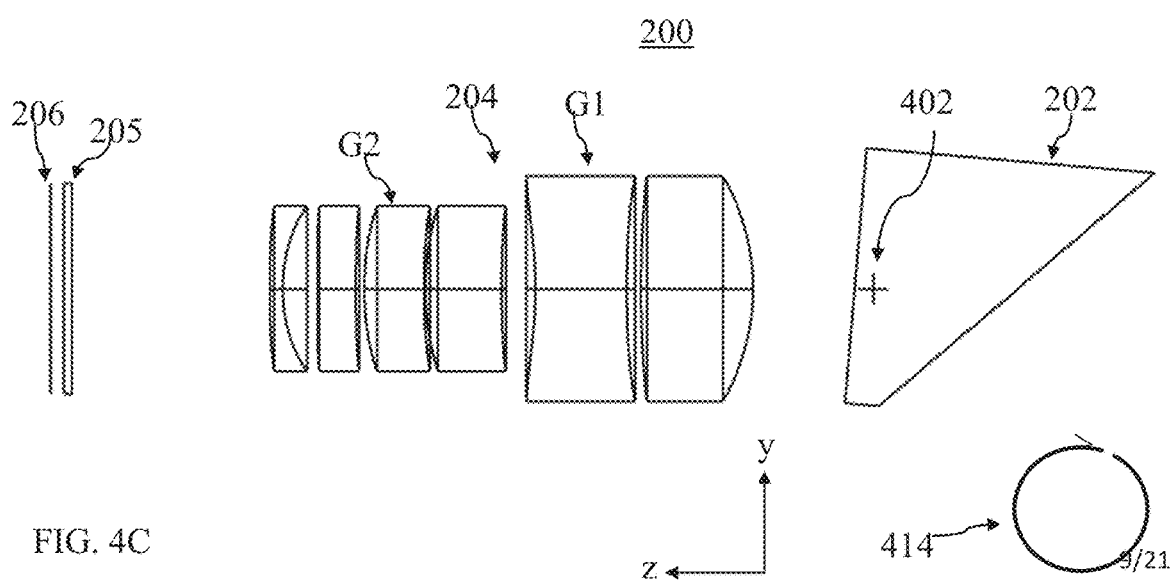

FIG. 4C shows STC 200 without module housing 210 from FIGS. 4A-B in a maximal clockwise rotation state with respect to the first rotation axis 402. The clockwise rotation direction 414 is shown.

Figure 4D:
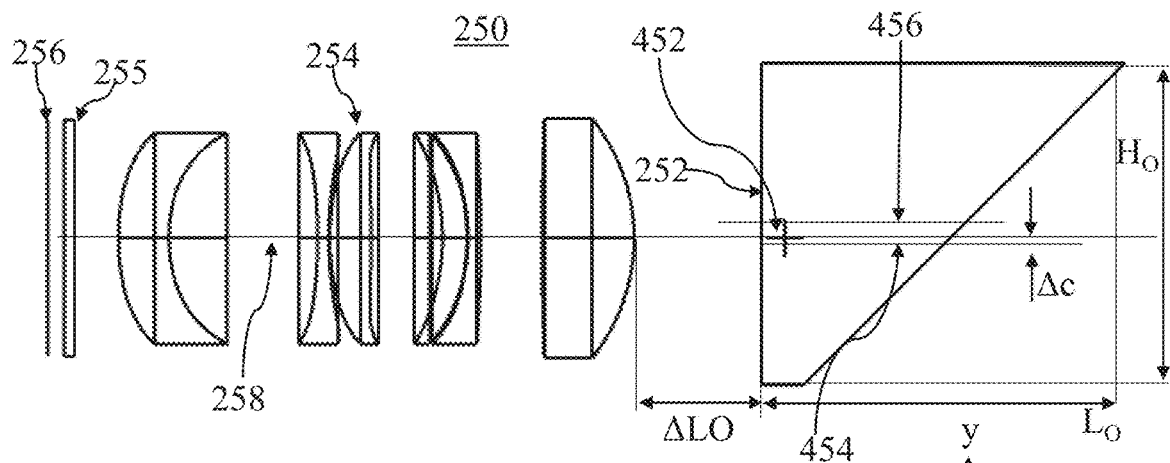
FIGS. 4D-4F show the folded STC from FIGS. 2C-D at different scan states around a first rotation axis in a cross-sectional view.

FIG. 4D shows STC 250 from FIGS. 2C-D without module housing 260 in a zero scan position in a cross-sectional view. OPFE 252 is rotated around a first rotation axis 452 which is parallel to the x-axis (i.e. perpendicular to both the y-axis and the z-axis shown). Non-cut center axis 454 indicates a center of a non-cut OPFE 252 with respect to the y-axis. Cut center axis 456 indicates a center of cut OPFE 252 with respect to the y-axis. First rotation axis 452 intersects with the optical axis 258 of lens 254, but first rotation axis 452 does not intersect with non-cut center axis 454 nor with cut center axis 456. First rotation axis 452 is located at distance ΔC from non-cut prism center axis 454. This de-center location of OPFE 252 is beneficial for minimizing $MH_M$. Image sensor 256 is oriented in a parallel STC sensor configuration.

Figure 4E:
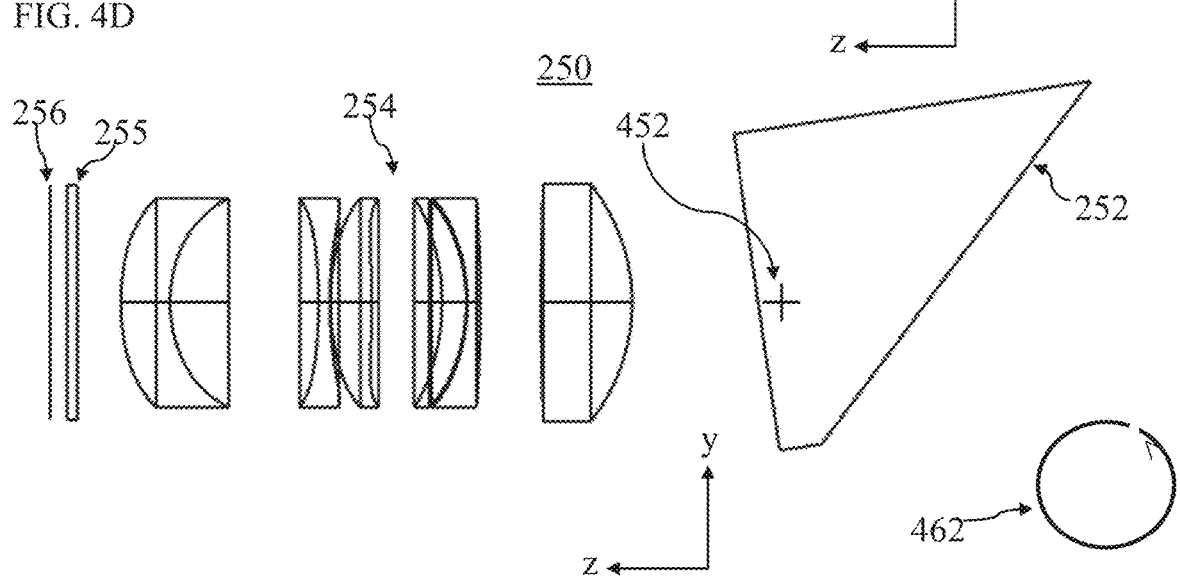

FIG. 4E shows STC 250 without module housing 260 from FIG. 4D in a maximal counter-clockwise rotation state with respect to the first rotation axis 452.

Figure 4F:
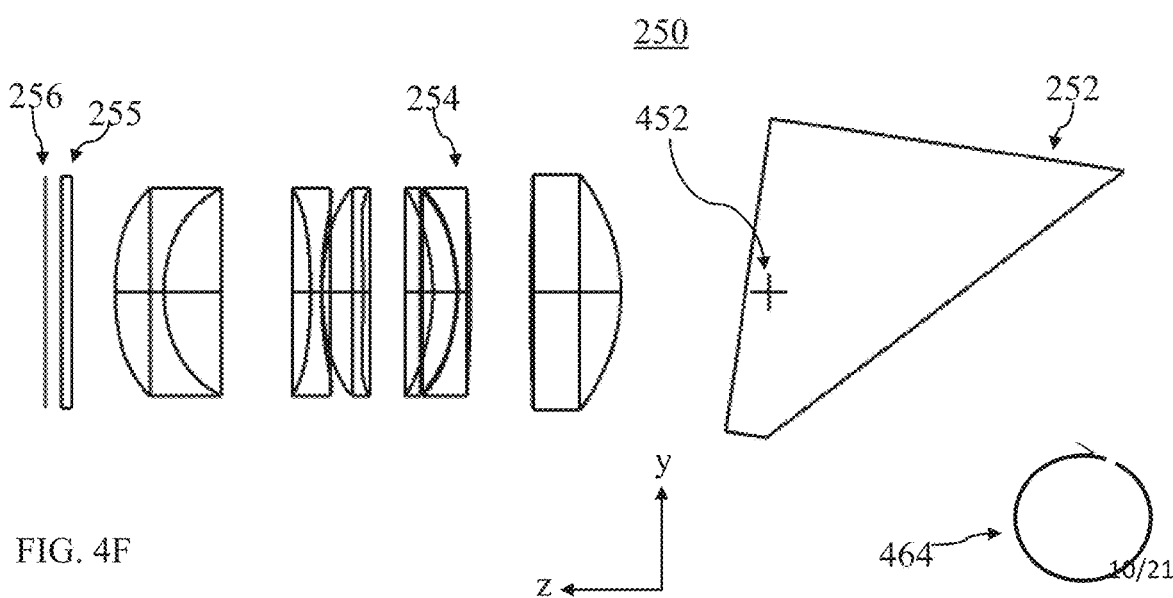

FIG. 4F shows STC 250 without module housing 260 from FIGS. 4D-E in a maximal clockwise rotation state with respect to the first rotation axis 452.

The counter-clockwise rotation direction 462 and the clockwise rotation direction 464 are shown.

Figure 5A:
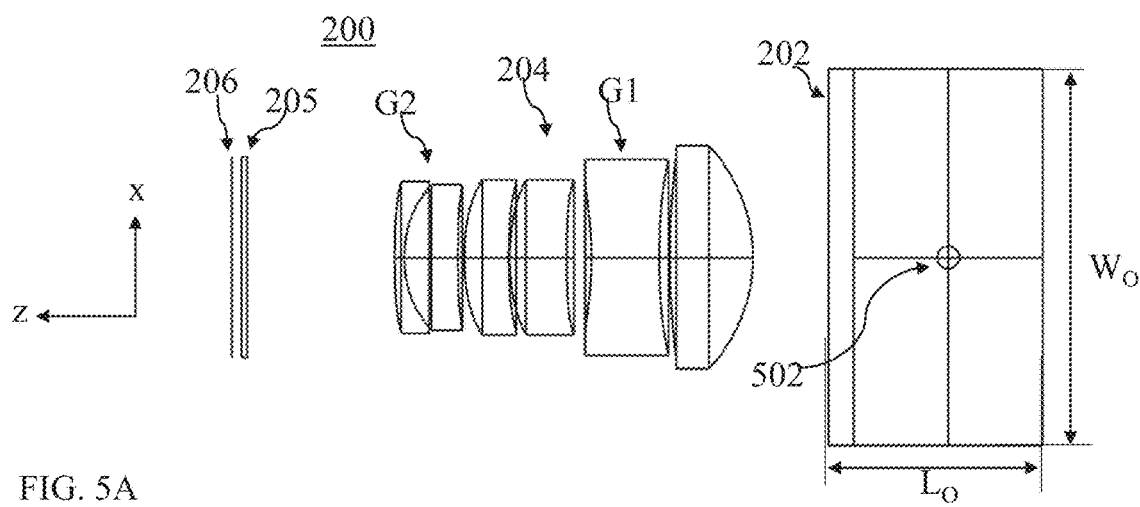
FIGS. 5A-5C show the folded STC from FIGS. 2A-B at different scan states around a second rotation axis in a cross-sectional view.

FIG. 5A shows STC 200 from FIGS. 2A-B without module housing 210 in a zero scan position in a top view. The zero scan position is defined by OPFE 202's top surface being parallel with the z-axis such that $n\text{-}FOV_T$ is located at the center of $s\text{-}FOV_T$. OPFE 202 is rotated around a second rotation axis 502 which is parallel to the y-axis (i.e. perpendicular to both the x-axis and the z-axis shown).

Figure 5B:
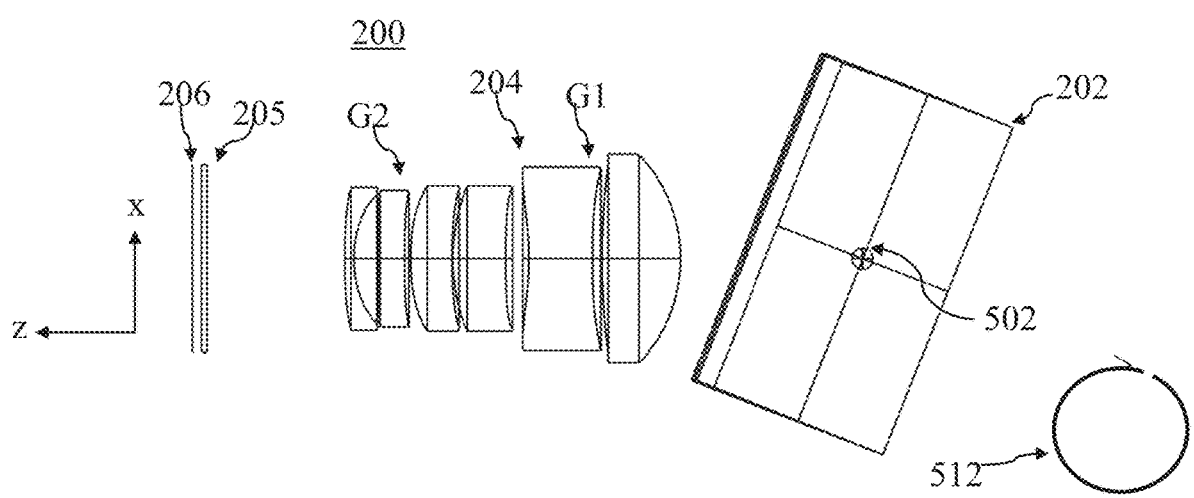

FIG. 5B shows STC 200 without module housing 210 from FIG. 5A in a maximal clockwise rotation state with respect to the second rotation axis 502. The clockwise rotation direction 512 is shown.

Figure 5C:
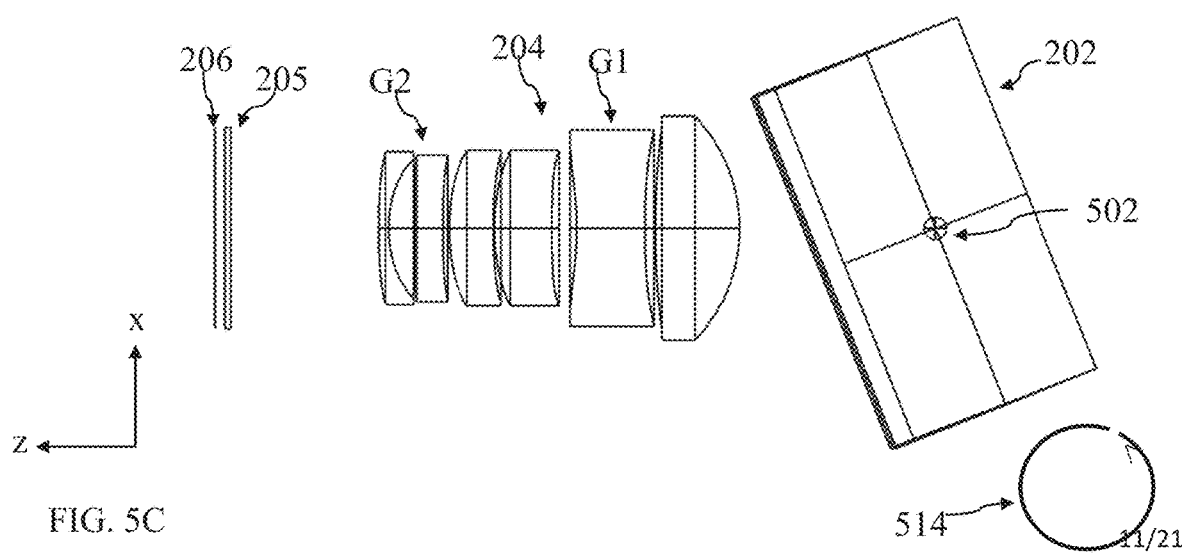

FIG. 5C shows STC 200 without module housing 210 from FIGS. 5A-B in a maximal counter-clockwise rotation state with respect to the second rotation axis 502. The counter-clockwise rotation direction 514 is shown.

Figure 5D:
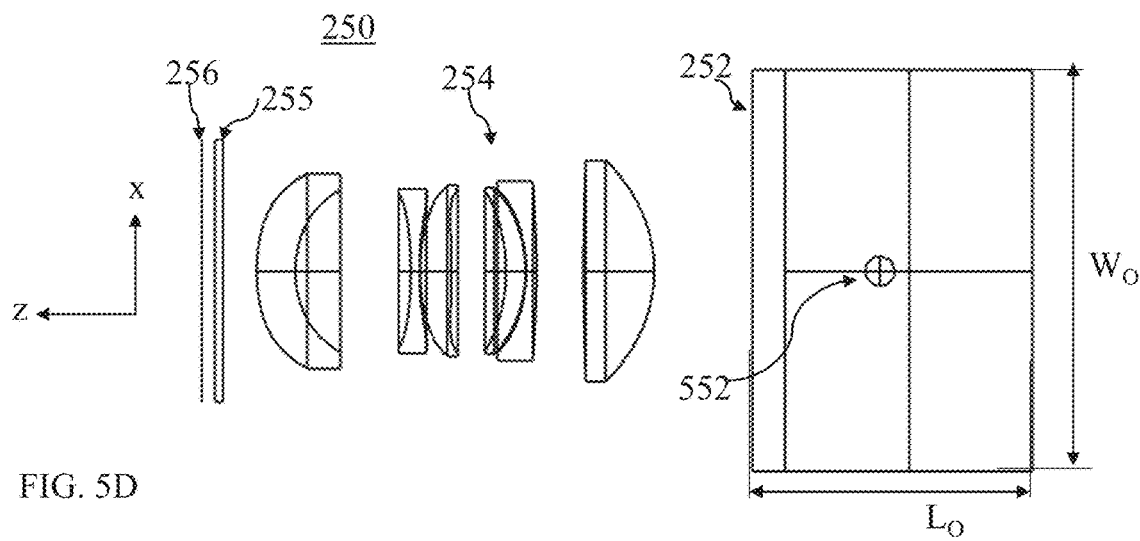
FIGS. 5D-5F show the folded STC from FIGS. 2C-D at different scan states around a second rotation axis in a cross-sectional view.

FIG. 5D shows STC 250 from FIGS. 2C-D without module housing 260 in a zero scan position in a top view. OPFE 252 is rotated around a second rotation axis 552 which is parallel to the y-axis (i.e. perpendicular to both the x-axis and the z-axis shown).

Figure 5E:
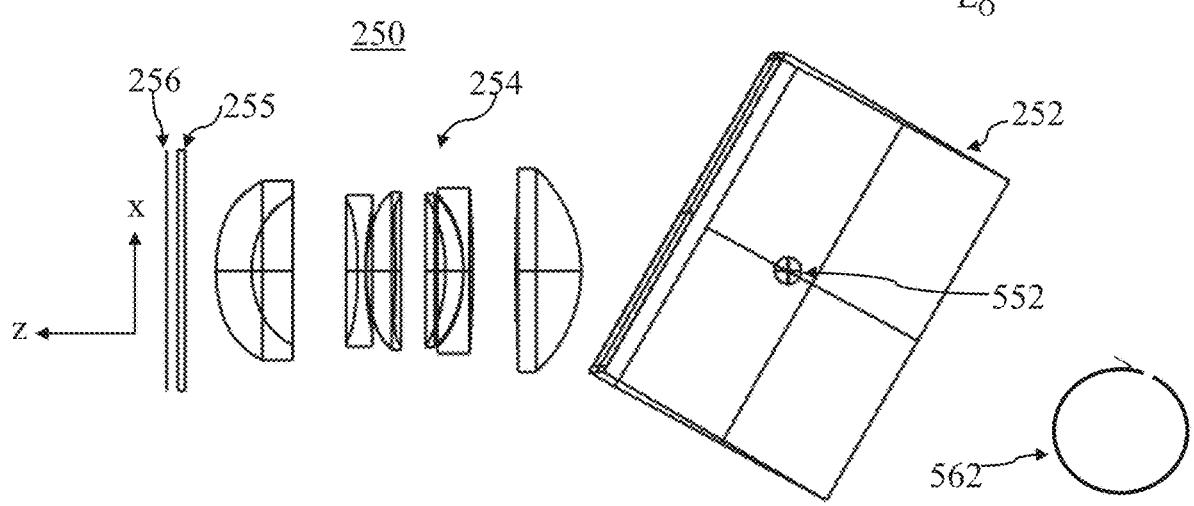

FIG. 5E shows STC 250 without module housing 260 from FIG. 5D in a maximal clockwise rotation state with respect to the second rotation axis 552.

Figure 5F:
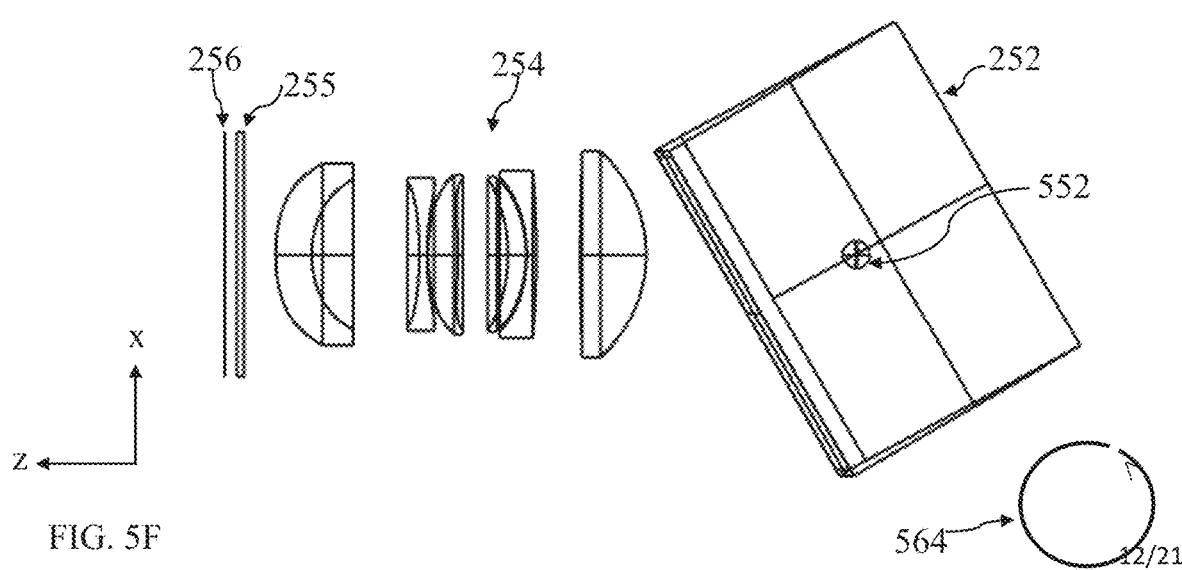

FIG. 5F shows STC 250 without module housing 210 from FIGS. 5D-E in a maximal counter-clockwise rotation state with respect to the second rotation axis 552.

Figure 6A:
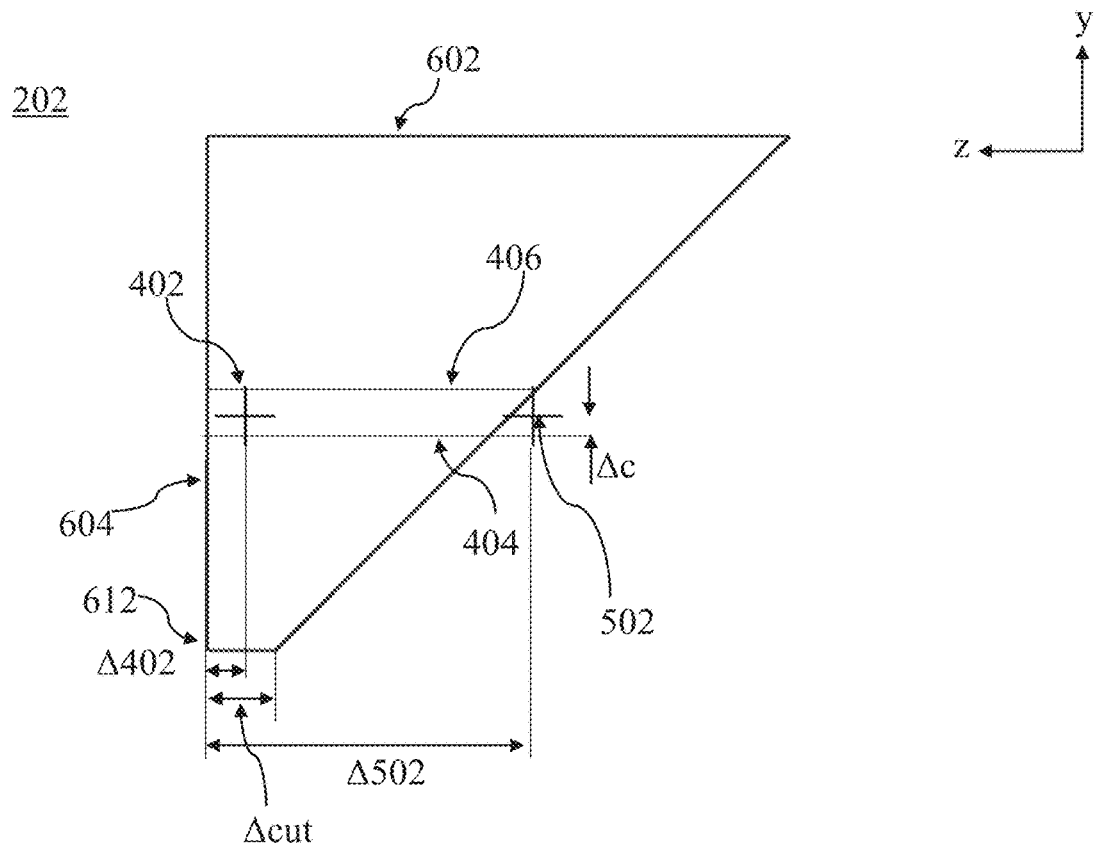
FIGS. 6A and 6B shows OPFE of the folded STC from FIGS. 2A-B and the first and the second rotation axis.

The clockwise rotation direction 562 and the counter-clockwise rotation direction 564 are shown. FIG. 6A shows OPFE 202 of STC 200 in a zero scan position in a cross-sectional view. The location of first rotation axis 402 and second rotation axis 502 are shown. A distance from first rotation axis 402 to OPFE 202's light exiting surface 604 is marked Δ402. Here, Δ402=0.5 mm. OPFE 202 is a cut prism which has a cut bottom corner (or margin) 612. Considering the cutting along the z-axis, a cut surface extends from light exiting surface 604 along a distance Δcut, as shown. Beneficially, first rotation axis 402 is located within this distance Δcut. This is valid also for all other OPFEs disclosed herein such as OPFE 202, OPFE 252 and OPFE 1102.

A distance from second rotation axis 502 to OPFE 202's light entering surface 602 is marked Δ502. Here, Δ502=4.3 mm.

Figure 6B:
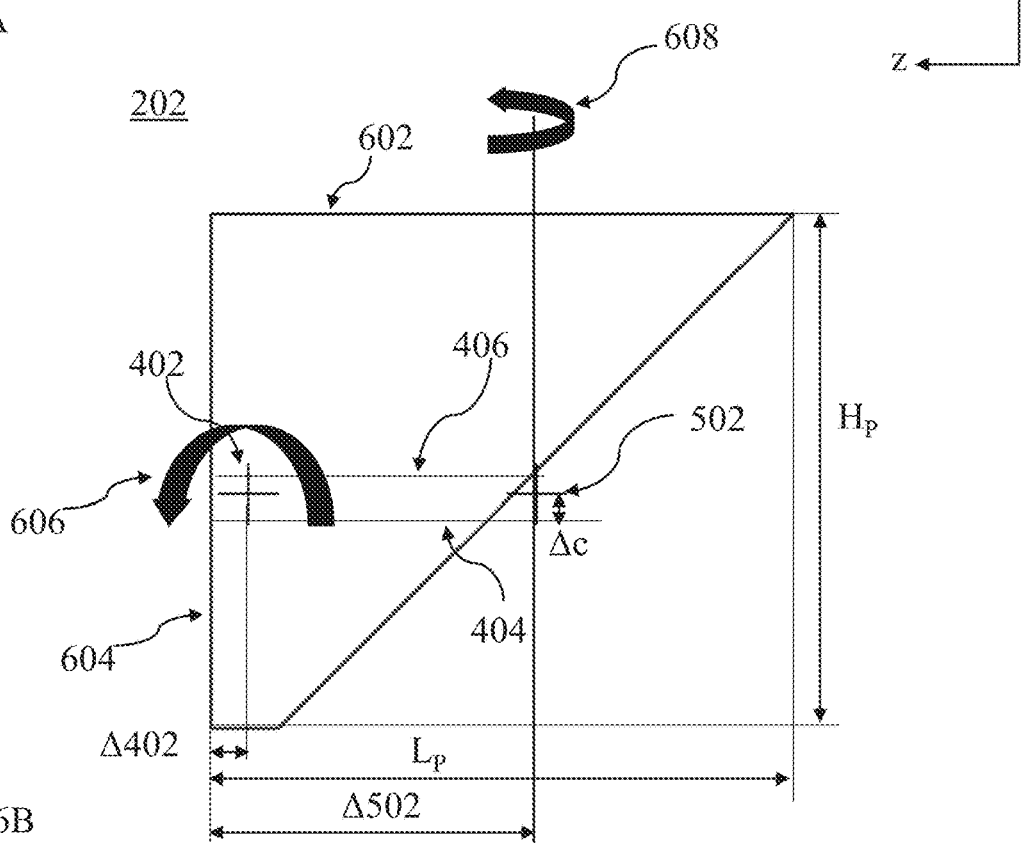

FIG. 6B shows OPFE 202 of STC 200 from FIG. 6A in a cross-sectional view. A first rotation direction 606 around first rotation axis 402 and a second rotation direction 608 around second rotation axis 404 are shown. A prism height $H_P$ and a prism length $L_P$ OPFE 202 are shown as well. Here, $L_P$=7.1 mm and $H_P$=6.9 mm. Ratios of $\Delta 402/L_P$=0.07 and $\Delta 502/H_P$=0.62.

Figure 6C:
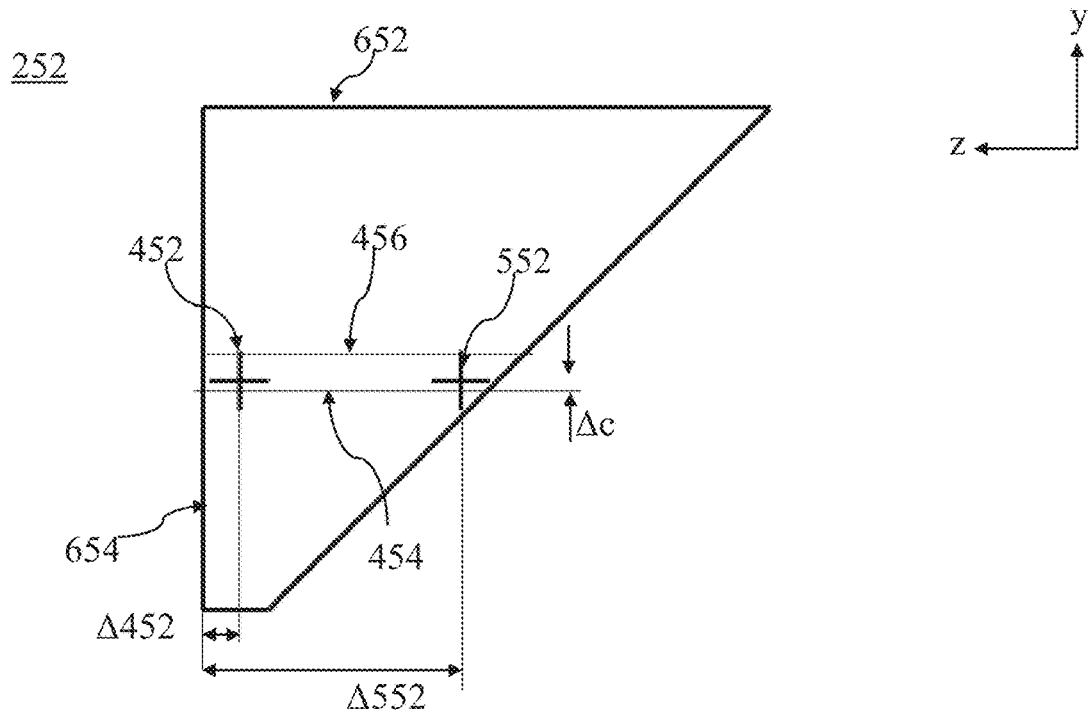
FIGS. 6C and 6D shows OPFE of the folded STC from FIGS. 2C-D and the first and the second rotation axis.

FIG. 6C shows OPFE 252 of STC 250 in a zero scan position in a cross-sectional view. OPFE 252 is a prism. The location of first rotation axis 452 and second rotation axis 552 are shown. A distance from first rotation axis 452 to OPFE 252's light exiting surface 654 is Δ452. Here, Δ452=0.5 mm. A distance from second rotation axis 552 to OPFE 252's light entering surface 652 is Δ552. Here, 4552=3.5 mm.

Figure 6D:
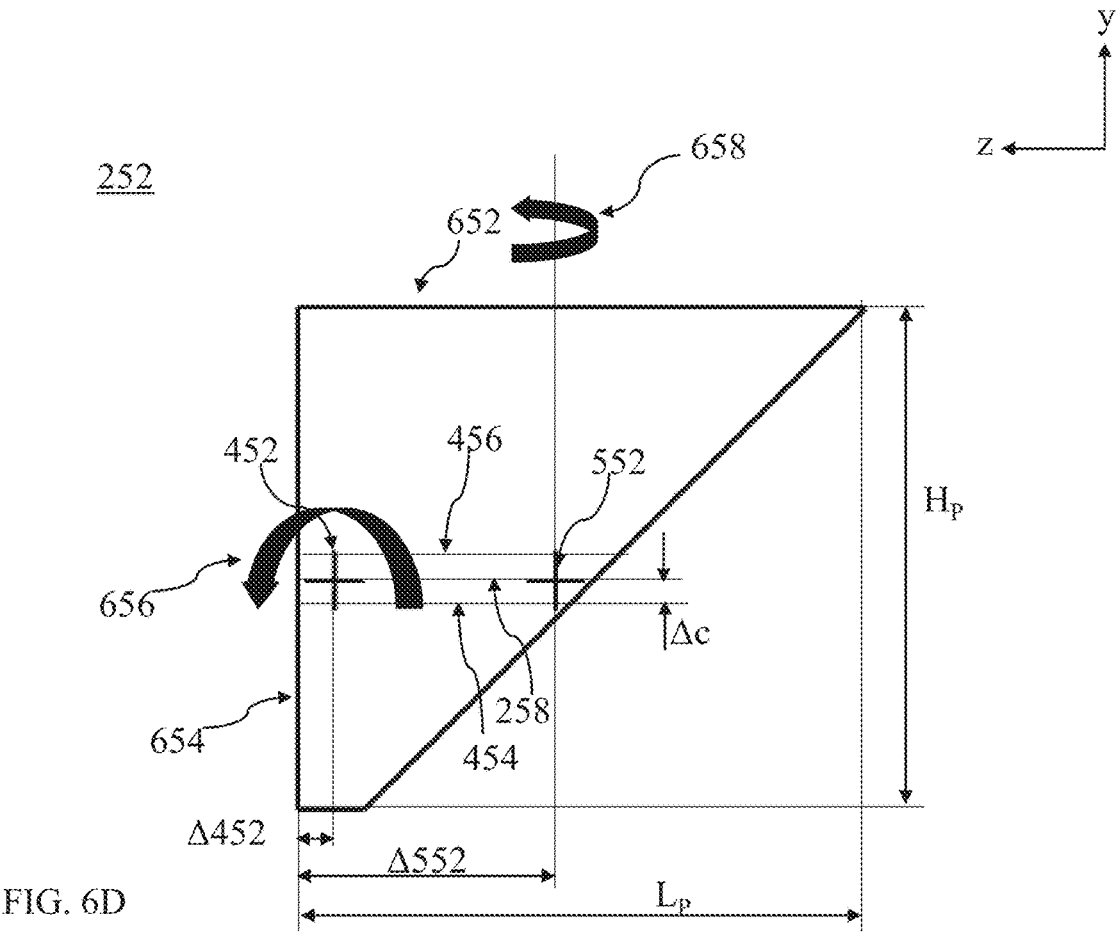

FIG. 6D shows OPFE 252 of STC 250 from FIG. 6C in a cross-sectional view. A first rotation direction 656 around first rotation axis 452 and a second rotation direction 658 around second rotation axis 454 as well as a length $L_P$ and height $H_P$ of OPFE 252 are shown. Here, $L_P$=7.2 mm and $H_P$=6.7 mm. Ratios of $\Delta 452/L_P$=0.07 and $\Delta 552/H_P$=0.52.

Figure 7:
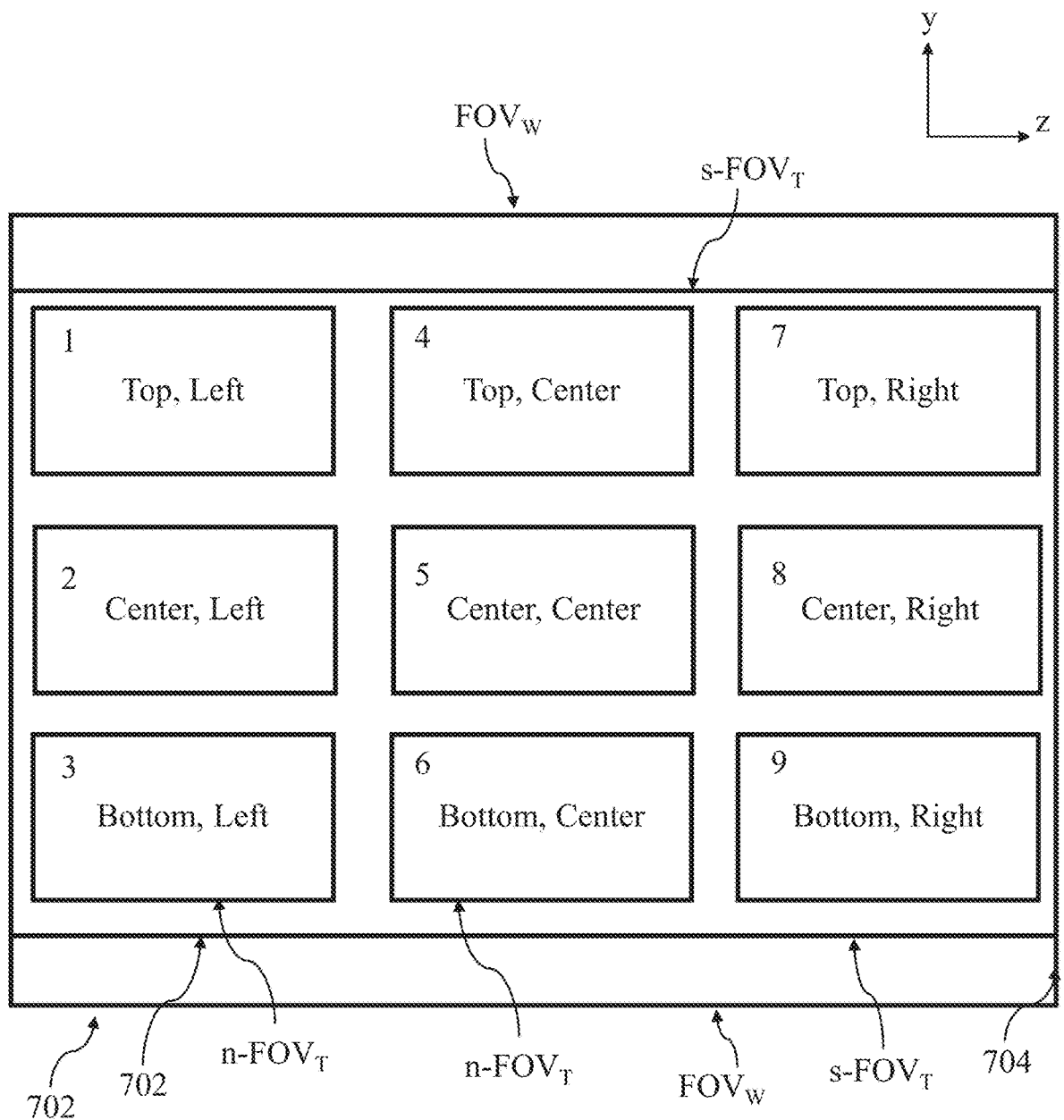
FIG. 7 shows a field-of-view of the folded STC from FIGS. 2A-B and FIGS. 2C-D.

FIG. 7 shows exemplary a Wide camera FOV ("$FOV_W$"), a $s\text{-}FOV_T$ and 9 $n\text{-}FOV_T$s (marked 1-9) of a known Wide camera and a STC such as STC 200 or STC 250 or STC 1250. $FOV_W$ shows a typical Wide camera FOV of for example 82° measured along a diagonal of $FOV_W$. In this example, a 16:9 FOV ratio of $FOV_W$ covers about 69.4°× 42.6° (i.e. 69° in a horizontal direction, 42° in a vertical direction). s-FOV-shows a segment of a scene that can be covered with the STC, i.e. it includes all POVs that can be reached with the STC. In some examples, $s\text{-}FOV_T$ may cover a 16:9 FOV ratio of $FOV_W$, as shown in FIG. 7. As visible, $FOV_W$ and $s\text{-}FOV_T$ have a "longer side" 702 (here, along the z-axis) and a "shorter side" 704 (here, along the z-axis). $s\text{-}FOV_T$ of STC 200 covers 50.9°×32.5° (50.9° in a horizontal direction, 32.5° in a vertical direction). The 9 $n\text{-}FOV_T$s represent maximum scan positions. $n\text{-}FOV_T$ 5, i.e. the (Center, Center) position, represents a zero scan position. For example, $n\text{-}FOV_T$ 1 represents the $n\text{-}FOV_T$ that is obtained when scanning STC 200 maximally to a top-left position, $n\text{-}FOV_T$ 6 represents the $n\text{-}FOV_T$ that is obtained when scanning STC 200 maximally to a bottom-center position etc. Table 1 provides the rotation values of OPFE 202 around (first rotation axis 402, second rotation axis 502) respectively that are required for scanning to the 9 respective $n\text{-}FOV_T$s. The values refer to a scanning action that starts from $n\text{-}FOV_T$ 5, i.e. the (Center, Center) position. For example for scanning $n\text{-}FOV_T$ to $n\text{-}FOV_T$ 9 or (Bottom, Right), starting from (Center, Center) position n-FOV$_T$ 5, OPFE 202 must be rotated by −7.85 degrees around first rotation axis 402 and by −15.46 degrees around second rotation axis 502.

TABLE 1

|  | Left | Center | Right |
|---|---|---|---|
| Top | (1.76, 21.67) | (4.86, 0) | (1.76, −21.67) |
| Center | (−3.16, 18.49) | (0, 0) | (−3.16, −18.49) |
| Bottom | (−7.85, 15.46) | (−4.86, 0) | (−7.85, −15.46) |

For STC 250 including optical lens system 900, Table 2 provides the rotation values of OPFE 252 around (first rotation axis 452, second rotation axis 552) respectively that are required for scanning to the 9 respective n-FOV$_T$s shown in FIG. 7. s-FOV$_T$ of STC 250 covers 69.5°×42.58°. This means that s-FOV$_T$ of STC 250 covers a 16:9 ratio of a FOV$_W$ having a diagonal FOV$_W$=82°, as shown in FIG. 7

TABLE 2

|  | Left | Center | Right |
|---|---|---|---|
| Top | (3.63, 29.80) | (8.35, 0) | (3.63, −29.80) |
| Center | (−5.80, 24.02) | (0, 0) | (−5.80, −24.02) |
| Bottom | (−11.67, 18.83) | (−8.35, 0) | (−11.67, −18.83) |

For another STC (not shown) including optical lens system 1000, Table 3 provides the rotation values of OPFE 1002 around a first rotation axis and around a second rotation axis respectively that are required for scanning to the 9 respective n-FOV$_T$s shown in FIG. 7. s-FOV of the STC including optical lens system 1000 covers 69.5°× 42.58°. This means that the s-FOV-covers a 16:9 ratio of a FOV$_W$ having a diagonal FOV$_W$=82°.

TABLE 3

|  | Left | Center | Right |
|---|---|---|---|
| Top | (1.49, 25.54) | (5.79, 0) | (1.49, −25.54) |
| Center | (−4.31, 21.34) | (0, 0) | (−4.31, −21.34) |
| Bottom | (−9.67, 17.16) | (−5.79, 0) | (−9.67, −17.16) |

In some examples, an OPFE may be rotated around one axis or around two axes for optical image stabilization (OIS). In some examples and per axis, an OPFE may be rotated by ±2 degrees or by ±5 degrees around a zero position for performing OIS. In other examples, an OPFE may be rotated by even ±10 degrees or more around a zero position for performing OIS. In these examples, in general a mobile device including the STC includes as well an additional sensor such as e.g. an inertial measurement unit (IMU) and a processor, e.g. an application processor (AP) or a micro controller unit (MCU). The additional sensor is used for sensing an undesired rotation of the mobile device, and based on the sensing data of the additional sensor, the processor calculates OPFE rotation control signals which control a rotational movement of the OPFE that mitigates (or counteracts) the undesired rotation of the mobile device.

Figure 8:
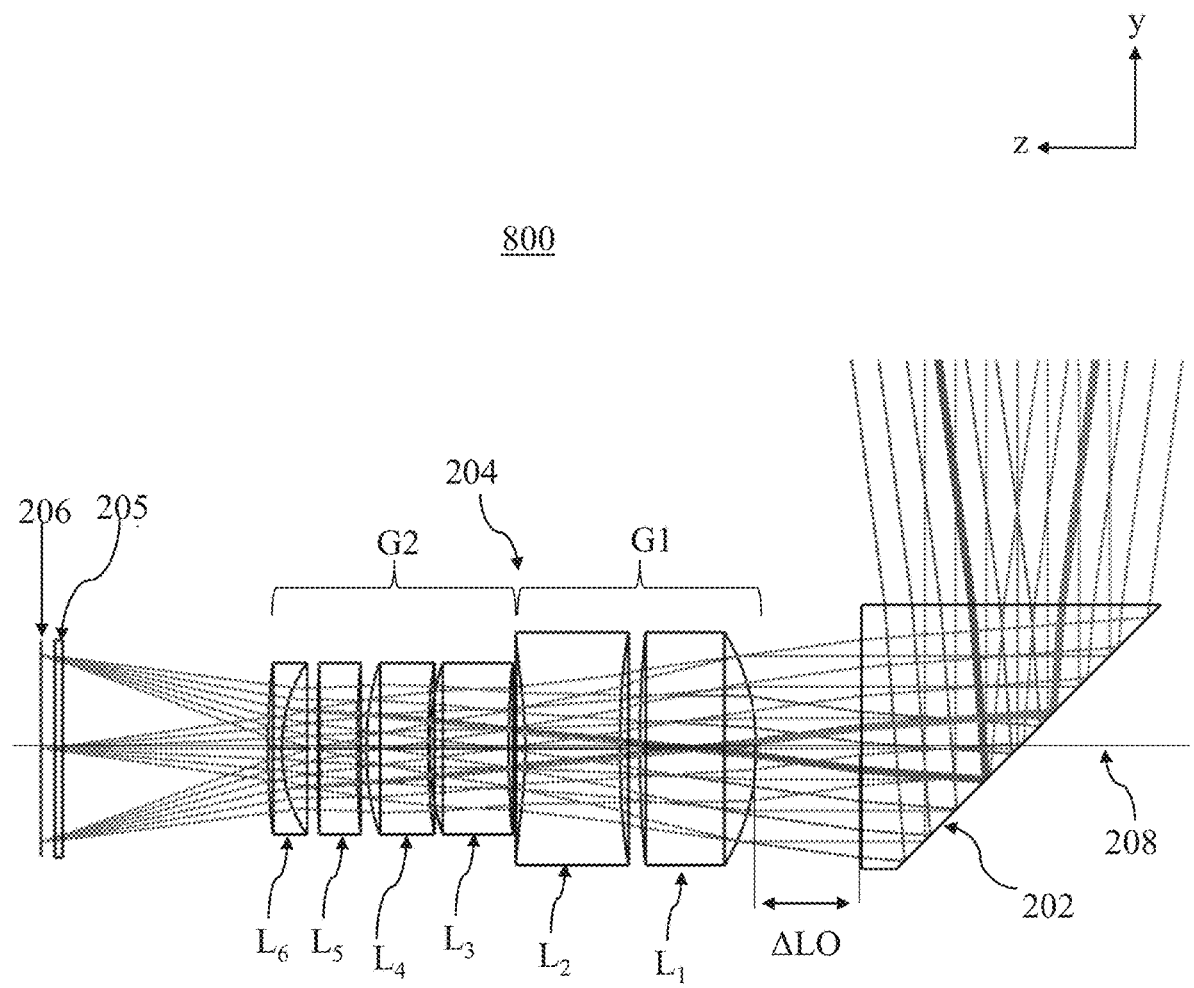
FIG. 8 shows an optical lens system included in the folded STC from FIGS. 2A-B.

FIG. 8 shows optical lens system 800 included in STC 200 from FIGS. 2A-B in a cross-sectional view and with ray-tracing. A distance $\Delta L_O$ between OPFE 202 and lens 204 is 2.7 mm.

The optical height ($H_{L1}$) and width ($W_{L1}$) of lens element $L_1$ may define the optical height and width of G1 (i.e. $H_{L1}=H_{G1}$ and $W_{L1}=W_{G1}$) as well as an aperture of camera 200, such that the optical height and the optical width of lens element $L_1$ represent also the aperture height (HA) and aperture width (WA) of lens 204 respectively. The D-cut of L1 and G1 means that also STC 200's aperture changes accordingly, such that the aperture is not axial symmetric. The cutting allows for a small lens heights $H_{G1}$, which are required for small MH$_M$s, and still relatively large effective aperture diameters (DAs) which satisfy DA>$H_{G1}$.

In other examples, an EFL of lens 204 may be 8 mm-50 mm.

G2 is D-cut as well. The optical height ($H_{L3}$) and width ($W_{L3}$) of lens element $L_3$ may define the optical height, width and aperture of G2. Prism 202 is D-cut as well.

Detailed optical data and surface data are given in Tables 2-3 for the example of the lens elements in FIG. 8. The values provided for these examples are purely illustrative and according to other examples, other values can be used.

Surface types are defined in Table 4. The coefficients for the surfaces are defined in Table 5. The surface types are:

a) Plano: flat surfaces, no curvature
b) Q type 1 (QT1) surface sag formula:

$$z(r) = \frac{cr^2}{1+\sqrt{1-(1+k)c^2r^2}} + D_{con}(u) \quad \text{(Eq. 1)}$$

$$D_{con}(u) = u^4 \sum_{n=0}^{N} A_n Q_n^{con}(u^2)$$

$$u = \frac{r}{r_{norm}}, x = u^2$$

$Q_0^{con}(x)=1$  $Q_1^{con}=-(5-6x)$  $Q_2^{con}=15-14x(3-2x)$ $Q_3^{con}=-\{35-12x[14-x(21-10x)]\}$ $Q_4^{con}=70-3x\{168-5x[84-11x(8-3x)]\}$ $Q_5^{con}=-[126-x(1260-11x\{420-x[720-13x(45-14x)]\})]$ c) Even Asphere (ASP) surface sag formula:

$$z(r) = \frac{cr^2}{1+\sqrt{1-(1+k)c^2r^2}} + \alpha_1 r^2 + \quad \text{(Eq. 2)}$$

$$\alpha_2 r^4 + \alpha_3 r^6 + \alpha_4 r^8 + \alpha_5 r^{10} + \alpha_6 r^{12} + \alpha_7 r^{14} + \alpha_8 r^{16}$$

Example 800
EFL = 17.37 mm, f number = 2.35 (Eff. DA/2 = 3.7 mm), HFOV = 12.8 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −1.543 | 4.000 |  |  |  |  |
| 2 | Lens 1 | ASP | 5.876 | 3.001 | 4.000 | Glass | 1.48 | 84.1 | 10.424 |

-continued

Example 800
EFL = 17.37 mm, f number = 2.35 (Eff. DA/2 = 3.7 mm), HFOV = 12.8 deg.

| Surface # | Comment | Type | Curvature Radius | Thickness | Aperture Radius (D/2) | Material | Index | Abbe # | Focal Length |
|---|---|---|---|---|---|---|---|---|---|
| 3 | | | −30.470 | 0.373 | 3.666 | | | | |
| 4 | Lens 2 | ASP | −34.332 | 2.433 | 3.515 | Plastic | 1.61 | 25.6 | −14.027 |
| 5 | | | 11.925 | 0.892 | 2.892 | | | | |
| 6 | Lens 3 | ASP | −30.326 | 2.043 | 2.774 | Plastic | 1.67 | 19.2 | 14.887 |
| 7 | | | −7.770 | 0.035 | 2.782 | | | | |
| 8 | Lens 4 | ASP | −22.896 | 1.591 | 2.672 | Plastic | 1.54 | 55.9 | 24.980 |
| 9 | | | −8.758 | 0.224 | 2.781 | | | | |
| 10 | Lens 5 | ASP | −69.824 | 1.017 | 2.618 | Plastic | 1.61 | 25.6 | −110.272 |
| 11 | | | 2962.171 | 0.927 | 2.516 | | | | |
| 12 | Lens 6 | ASP | −4.642 | 0.347 | 2.497 | Plastic | 1.61 | 25.6 | −8.581 |
| 13 | | | −38.037 | 5.279 | 2.732 | | | | |
| 14 | Filter | Plano | Infinity | 0.210 | — | Glass | 1.52 | 64.2 | |
| 15 | | | Infinity | 0.350 | — | | | | |
| 16 | Image | Plano | Infinity | — | — | | | | | where $\{z, r\}$ are the standard cylindrical polar coordinates, c is the paraxial curvature of the surface, k is the conic parameter, $r_{norm}$ is generally one half of the surface's clear aperture, and $A_n$ are the polynomial coefficients shown in lens data tables. The Z axis is positive towards the image. Values for aperture radius are given as a clear aperture radius, i.e. DA/2. The reference wavelength is 555.0 nm. Units are in mm except for refraction index ("Index") and Abbe #.

The same formulas, units and definitions are used also for Tables 6-11.

TABLE 5

| | Aspheric Coefficients | | | | |
|---|---|---|---|---|---|
| Surface # | Conic | $4^{th}$ | $6^{th}$ | $8^{th}$ | $10^{th}$ |
| 2 | 0 | −2.45E−06 | 1.03E−05 | −9.26E−07 | 8.22E−08 |
| 3 | 0 | −7.38E−05 | 1.77E−06 | −1.09E−06 | 1.02E−07 |
| 4 | 0 | −1.19E−03 | −1.87E−05 | 1.97E−06 | 1.94E−07 |
| 5 | 0 | −2.78E−04 | −2.26E−04 | −8.07E−06 | 2.41E−06 |
| 6 | 0 | 1.31E−03 | −5.27E−04 | 7.78E−06 | −2.89E−06 |
| 7 | 0 | 5.97E−04 | −2.77E−04 | −1.68E−05 | 5.15E−06 |
| 8 | 0 | −2.20E−03 | 1.74E−04 | −3.81E−05 | 1.19E−06 |
| 9 | 0 | −1.95E−03 | −1.73E−04 | −6.31E−06 | 3.10E−07 |
| 10 | 0 | 1.16E−04 | −8.54E−04 | 3.38E−05 | 8.06E−06 |
| 11 | 0 | 4.28E−04 | −7.22E−04 | 4.63E−05 | 3.53E−06 |
| 12 | 0 | −3.11E−03 | −1.03E−04 | −6.08E−06 | 3.71E−07 |
| 13 | 0 | −3.09E−03 | 1.09E−04 | 8.66E−06 | −2.01E−06 |

| | Aspheric Coefficients (Continued) | | |
|---|---|---|---|
| Surface # | $12^{th}$ | $14^{th}$ | $16^{th}$ |
| 2 | −2.68E−09 | 5.28E−13 | −2.97E−14 |
| 3 | −1.97E−09 | −7.40E−14 | 9.91E−15 |
| 4 | −7.91E−09 | 3.55E−12 | 4.10E−13 |
| 5 | −8.91E−08 | 1.09E−09 | 8.66E−13 |
| 6 | 5.28E−07 | −1.95E−08 | −4.33E−13 |
| 7 | −2.86E−07 | 7.01E−09 | 6.35E−12 |
| 8 | 1.26E−07 | −6.82E−09 | −5.07E−12 |
| 9 | 2.95E−07 | −3.40E−08 | 1.09E−09 |
| 10 | −1.52E−07 | −2.21E−08 | 1.29E−10 |
| 11 | 2.90E−08 | −2.34E−08 | 6.33E−10 |
| 12 | 2.55E−08 | −6.72E−08 | 5.93E−09 |
| 13 | −1.59E−07 | 3.54E−08 | −1.12E−09 |

Figure 9:
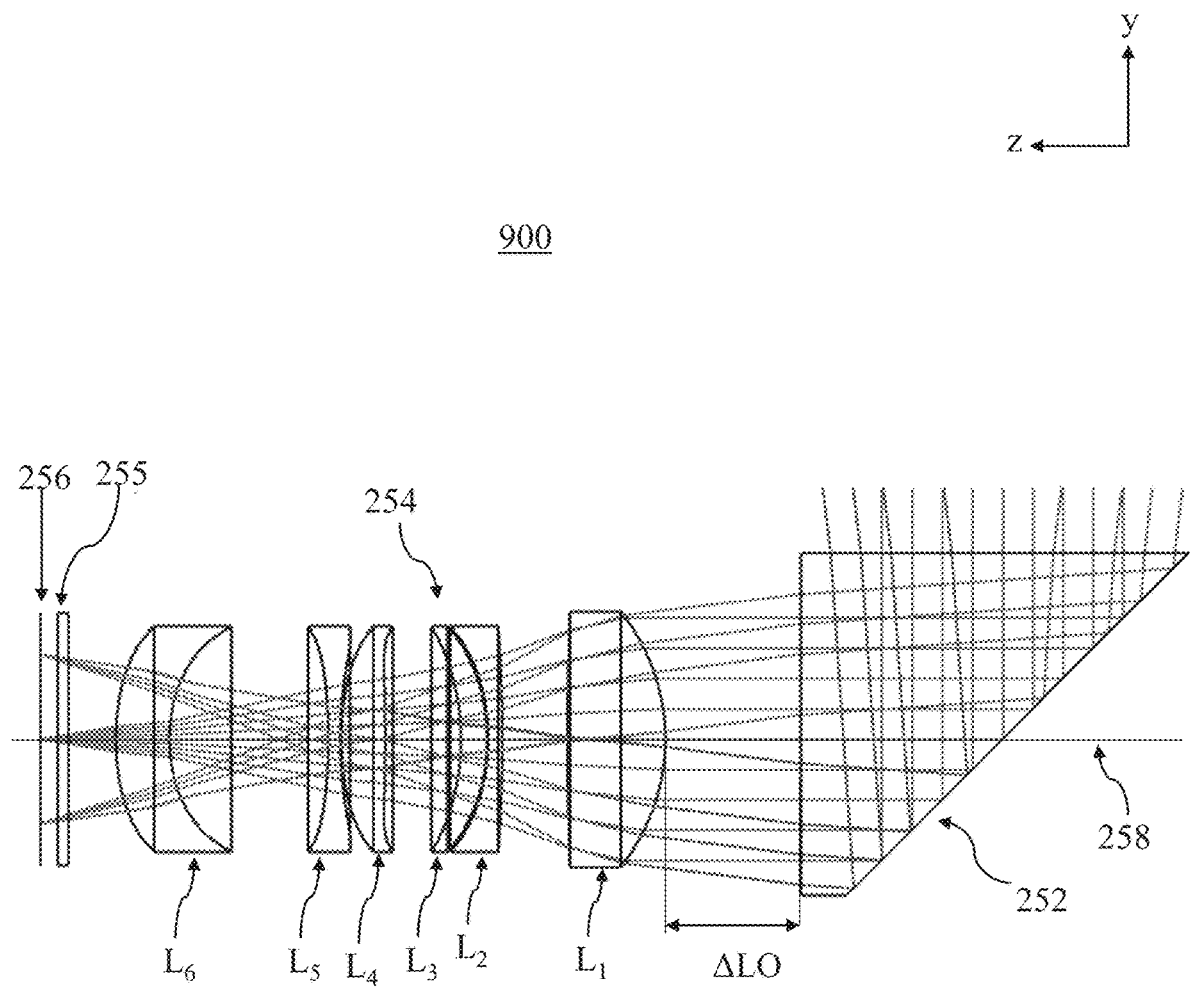
FIG. 9 shows an optical lens system included in the folded STC from FIGS. 2C-D.

FIG. 9 shows optical lens system 900 included in STC 250 from FIGS. 2C-D in a cross-sectional view and with ray-tracing. $\Delta L_O$ is 2.7 mm, $\Delta C$ is 0.15 mm.

The optical height ($H_{L1}$) and width ($W_{L1}$) of lens element $L_1$ may define the optical height and width of lens 254 as well as an aperture of STC 250, such that the optical height and the optical width of lens element $L_1$ represent also the aperture height (HA) and aperture width (WA) of lens 254 respectively. The D-cut of $L_1$ means that also STC 250's aperture changes accordingly. The cutting allows for a small HA and still relatively large effective DAs which satisfy DA>HA. In other examples, an EFL of lens 254 may be 8 mm-50 mm. Prism 252 is D-cut as well. A s-$FOV_T$ is 69.5deg×42.58deg, i.e. a horizontal direction of s-$FOV_T$ ("H-s-$FOV_T$") is H-s-$FOV_T$=69.5deg, a vertical direction of s-$FOV_T$ ("V-s-$FOV_T$") is V-s-$FOV_T$=42.58deg. s-$FOV_T$ covers a 16:9 FOV ratio of a $FOV_W$=82deg (diagonal) of a Wide camera that may be included in a mobile device together with the STC.

Detailed optical data and surface data are given in Tables 6-7.

TABLES 6-7

| | Aspheric Coefficients | | | | |
|---|---|---|---|---|---|
| Surface # | Conic | $4^{th}$ | $6^{th}$ | $8^{th}$ | $10^{th}$ |
| 2 | 0 | −3.85E−04 | −1.13E−05 | −2.76E−06 | −9.98E−08 |
| 3 | 0 | 8.43E−04 | −5.11E−05 | −4.46E−07 | 2.27E−07 |
| 4 | 0 | −1.17E−03 | 1.34E−06 | −2.87E−06 | 1.51E−06 |
| 5 | 0 | 2.58E−03 | 1.86E−05 | 6.27E−05 | 8.43E−06 |
| 6 | 0 | 2.92E−03 | −3.50E−04 | 5.10E−05 | 7.31E−06 |
| 7 | 0 | 9.39E−04 | −1.77E−04 | −2.83E−05 | 3.52E−06 |
| 8 | 0 | 1.43E−03 | −6.10E−04 | −1.44E−04 | −1.32E−05 |
| 9 | 0 | −3.91E−03 | −4.05E−04 | 1.55E−05 | −1.41E−06 |
| 10 | 0 | −2.93E−03 | −5.10E−04 | 2.28E−04 | 3.56E−05 |
| 11 | 0 | 5.67E−03 | −4.18E−04 | 9.28E−05 | 1.35E−05 |
| 12 | 0 | −3.50E−03 | −7.08E−04 | 5.45E−04 | −2.00E−04 |
| 13 | 0 | −1.21E−02 | 9.04E−04 | −9.24E−05 | −7.71E−06 |

| | Aspheric Coefficients (Continued) | | |
|---|---|---|---|
| Surface # | $12^{th}$ | $14^{th}$ | $16^{th}$ |
| 2 | −5.82E−10 | 7.38E−10 | −1.79E−10 |
| 3 | −8.02E−09 | −1.13E−09 | 6.18E−11 |
| 4 | 1.92E−07 | −6.49E−09 | −1.47E−09 |
| 5 | 2.83E−07 | 1.11E−07 | −2.77E−08 |
| 6 | 1.28E−06 | −1.04E−06 | −1.23E−06 |
| 7 | 8.01E−07 | 5.64E−07 | −6.36E−08 |
| 8 | −2.77E−06 | −5.16E−07 | 9.10E−08 |
| 9 | −1.75E−06 | −4.88E−07 | 5.63E−08 |
| 10 | 9.70E−07 | −9.49E−07 | 4.30E−08 |

TABLES 6-7-continued

| 11 | −9.57E−07 | 9.48E−07 | −1.14E−07 |
| 12 | −1.59E−05 | 7.95E−06 | −4.71E−07 |
| 13 | −5.10E−06 | 9.72E−07 | −3.87E−08 |

Example 900
EFL = 14.1 mm, f number = 2.45 (Eff. DA/2 = 2.9 mm), HFOV = 11.5 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −1.246 | 3.000 | | | | |
| 2 | Lens 1 | ASP | 3.981 | 1.941 | 3.013 | Glass | 1.48 | 84.1 | 7.619 |
| 3 | | | −44.268 | 1.288 | 2.903 | | | | |
| 4 | Lens 2 | ASP | 23.035 | 0.281 | 2.448 | Plastic | 1.61 | 25.6 | −8.410 |
| 5 | | | 4.224 | 0.020 | 2.232 | | | | |
| 6 | Lens 3 | ASP | 3.832 | 0.531 | 2.251 | Plastic | 1.53 | 55.7 | 32.268 |
| 7 | | | 4.684 | 1.504 | 2.199 | | | | |
| 8 | Lens 4 | ASP | 43.147 | 0.869 | 2.230 | Plastic | 1.66 | 20.4 | 7.554 |
| 9 | | | −5.655 | 0.018 | 2.326 | | | | |
| 10 | Lens 5 | ASP | −9.456 | 0.238 | 2.231 | Plastic | 1.61 | 25.6 | −8.644 |
| 11 | | | 12.423 | 3.160 | 2.100 | | | | |
| 12 | Lens 6 | ASP | −3.038 | 1.058 | 2.193 | Plastic | 1.53 | 55.7 | −14.591 |
| 13 | | | −5.570 | 0.941 | 2.654 | | | | |
| 14 | Filter | Plano | Infinity | 0.210 | — | Glass | 1.52 | 64.2 | |
| 15 | | | Infinity | 0.350 | — | | | | |
| 16 | Image | Plano | Infinity | — | — | | | | |

Figure 10:
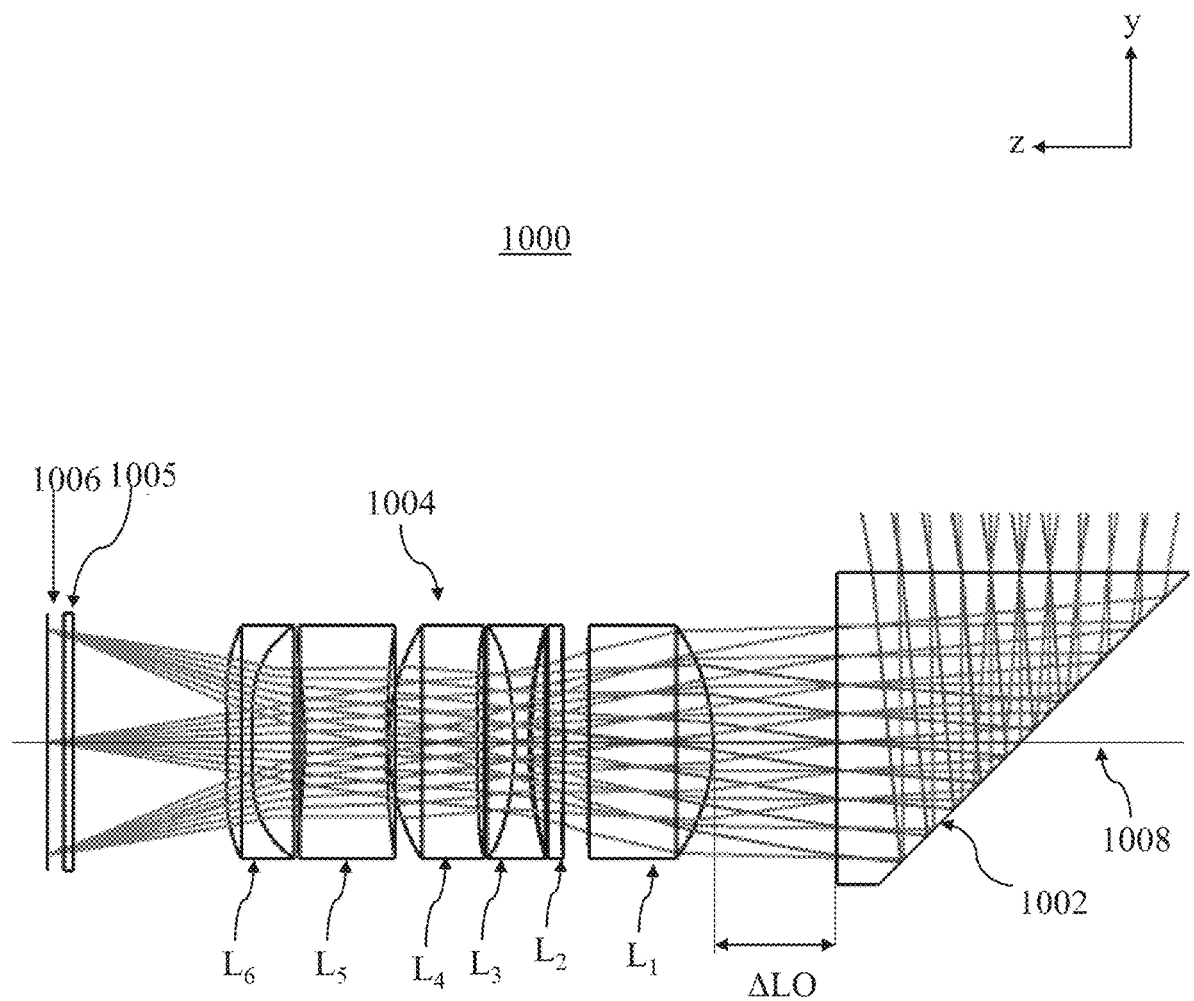
FIG. 10 shows another optical lens system disclosed herein.

FIG. 10 shows another optical lens system 1000 disclosed herein in a cross-sectional view and with ray-tracing. Optical lens system 1000 may be included in a STC such as STC 200 or STC 250. Optical lens system 1000 includes a prism 1002, a lens 1004 including N=6 lens elements, an (optional) optical filter 1005 and an image sensor 1006. $\Delta L_O$ is 2.7 mm, $\Delta C$ is 0.15 mm. A distance from a first rotation axis to OPFE 1002's light exiting surface is 0.5 mm. A distance from a second rotation axis to OPFE 1000's light exiting surface is 4.3 mm.

$H_{L1}$ and $W_{L1}$ of lens element $L_1$ may define the optical height and width of lens 1004 as well as an aperture of a STC that includes optical lens system 1000, such that the optical height and the optical width of lens element $L_1$ represent also the aperture height (HA) and aperture width (WA) of lens 1004 respectively. Lens 1004, i.e. $L_1$ and further lens elements, as well as prism 1002 are D-cut. In other examples, an EFL of lens 1004 may be 8 mm-50 mm and SD may be 4 mm-15 mm. Detailed optical data and surface data are given in Tables 8-9.

TABLE 8

Example 1000
EFL = 14.1 mm, f number = 2.45 (Eff. DA/2 = 2.9 mm), HFOV = 15.7 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −1.121 | 3.000 | | | | |
| 2 | Lens 1 | ASP | 4.321 | 2.708 | 3.018 | Glass | 1.48 | 84.1 | 9.046 |
| 3 | | | 208.561 | 0.539 | 2.844 | | | | |
| 4 | Lens 2 | ASP | 23.819 | 0.709 | 2.712 | Plastic | 1.57 | 37.4 | 13.890 |
| 5 | | | −11.728 | 0.062 | 2.688 | | | | |
| 6 | Lens 3 | ASP | −8.405 | 0.308 | 2.646 | Plastic | 1.61 | 25.6 | −6.440 |
| 7 | | | 7.678 | 0.811 | 2.474 | | | | |
| 8 | Lens 4 | ASP | −58.073 | 1.934 | 2.505 | Plastic | 1.67 | 19.2 | 8.073 |
| 9 | | | −5.062 | 0.038 | 2.826 | | | | |
| 10 | Lens 5 | ASP | −35.454 | 1.794 | 2.765 | Plastic | 1.61 | 25.6 | −11.971 |
| 11 | | | 9.540 | 1.157 | 2.577 | | | | |
| 12 | Lens 6 | ASP | −67.401 | 0.525 | 2.551 | Plastic | 1.67 | 19.2 | −15.109 |
| 13 | | | 12.096 | 3.371 | 2.909 | | | | |
| 14 | Filter | Plano | Infinity | 0.210 | — | Glass | 1.52 | 64.2 | |
| 15 | | | Infinity | 0.350 | — | | | | |
| 16 | Image | Plano | Infinity | — | — | | | | |

TABLE 9

| | | Aspheric Coefficients | | | |
|---|---|---|---|---|---|
| Surface # | Conic | $4^{th}$ | $6^{th}$ | $8^{th}$ | $10^{th}$ |
| 2 | 0 | −1.30E−04 | −1.20E−05 | −1.85E−06 | 1.87E−07 |
| 3 | 0 | 7.73E−04 | −2.67E−04 | −5.52E−06 | 2.38E−06 |
| 4 | 0 | −7.46E−04 | −4.36E−04 | −1.63E−05 | 5.83E−06 |
| 5 | 0 | −1.90E−03 | 2.66E−05 | −1.30E−06 | 1.60E−06 |
| 6 | 0 | 1.67E−03 | −5.80E−04 | 8.83E−05 | −5.04E−06 |
| 7 | 0 | 3.06E−03 | −2.99E−04 | −5.92E−05 | 3.02E−05 |
| 8 | 0 | −1.90E−03 | 3.91E−04 | −1.26E−04 | 5.48E−06 |
| 9 | 0 | −1.56E−03 | 2.81E−04 | −1.86E−05 | −6.04E−06 |

TABLE 9-continued

| | | | | | |
|---|---|---|---|---|---|
| 10 | 0 | -3.81E-03 | -1.27E-04 | 1.13E-04 | -1.19E-05 |
| 11 | 0 | -3.87E-03 | -7.18E-04 | 1.83E-04 | -3.44E-05 |
| 12 | 0 | -2.57E-02 | 1.22E-03 | -4.89E-05 | -4.84E-06 |
| 13 | 0 | -2.37E-02 | 2.34E-03 | -1.49E-04 | -1.79E-06 |

| | Aspheric Coefficients (Continued) | | |
|---|---|---|---|
| Surface # | $12^{th}$ | $14^{th}$ | $16^{th}$ |
| 2 | -5.47E-08 | 3.88E-09 | -2.08E-10 |
| 3 | -1.56E-07 | 8.60E-09 | -2.61E-10 |
| 4 | 2.11E-08 | -4.48E-08 | 1.98E-09 |
| 5 | -9.67E-07 | 9.65E-08 | -2.76E-09 |
| 6 | 5.46E-07 | -1.04E-07 | 4.93E-09 |
| 7 | -3.15E-06 | 3.96E-07 | -2.26E-08 |
| 8 | 1.13E-06 | -1.54E-07 | 5.51E-09 |
| 9 | 1.08E-06 | -7.98E-08 | 2.33E-09 |
| 10 | 2.81E-07 | 1.09E-07 | -6.13E-09 |
| 11 | 4.58E-06 | -4.02E-07 | 1.43E-08 |
| 12 | -2.96E-06 | 6.02E-07 | -2.54E-08 |
| 13 | 1.11E-06 | -5.00E-08 | 4.36E-10 |

Figure 11A:
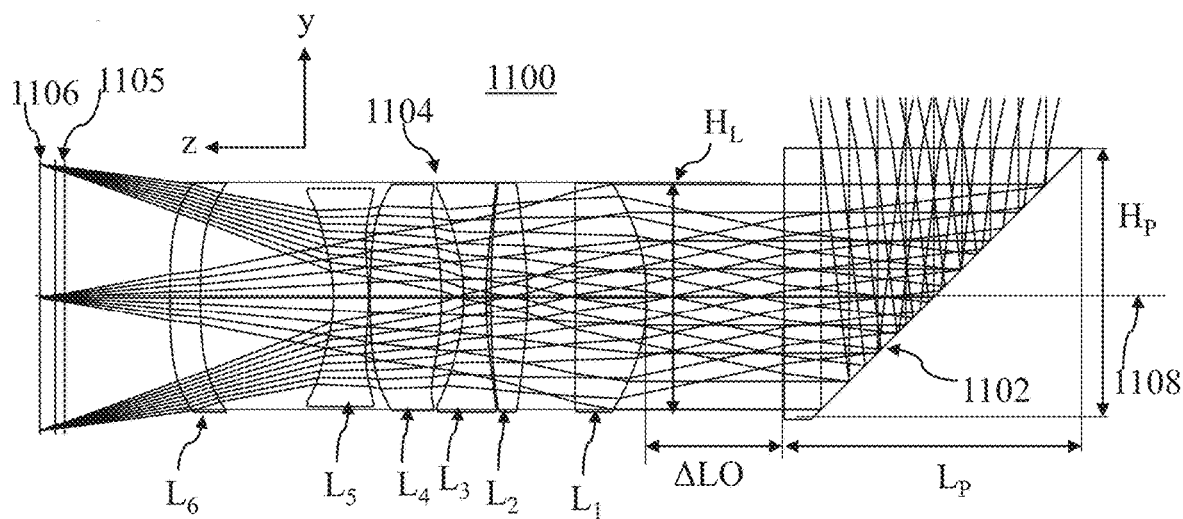
FIG. 11A shows yet another optical lens system disclosed herein in a cross-sectional view.
Figure 11B:
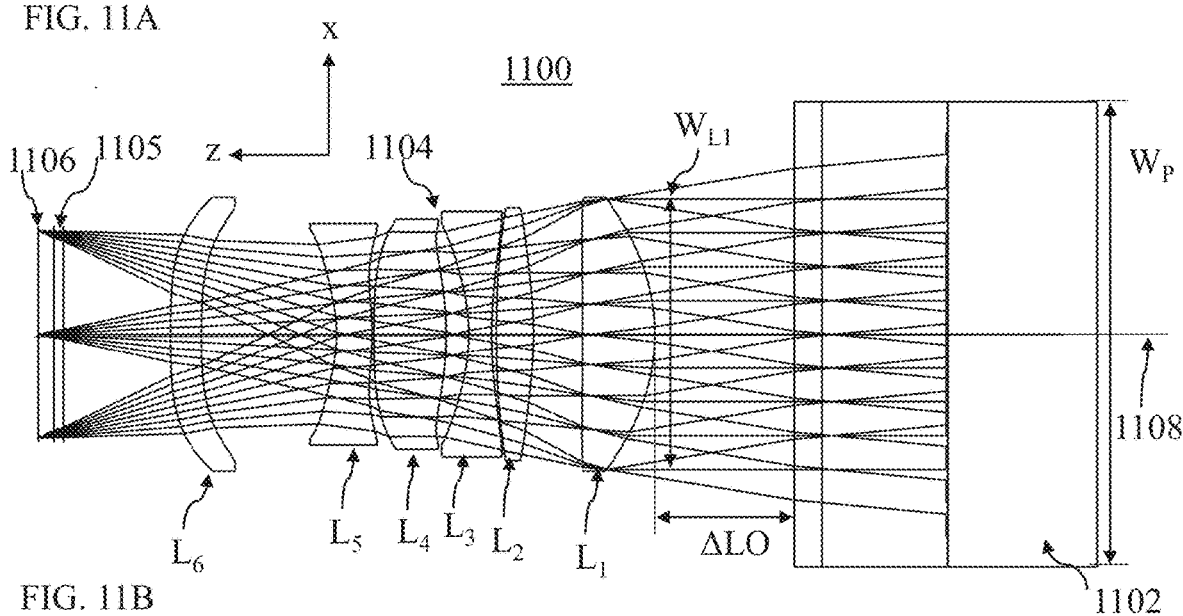
FIG. 11B shows yet another optical lens system disclosed herein in a top view.
Figure 11C:
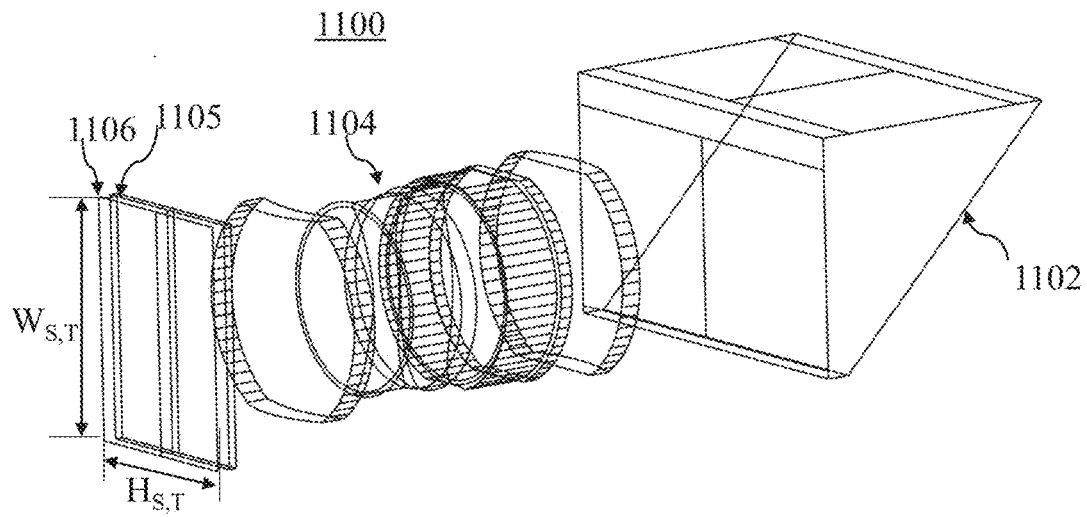
FIG. 11C shows yet another optical lens system disclosed herein in a perspective view.

FIG. 11 shows another optical lens system 1100 disclosed herein with ray-tracing. FIG. 11A shows optical lens system 1100 in a cross-sectional view. FIG. 11B shows optical lens system 1100 in a top view. FIG. 11C shows optical lens system 1100 in a perspective view.

Optical lens system 1100 includes an OPFE 1102 (e.g. a prism or a mirror), a lens 1104 including N=6 lens elements $L_1$-$L_6$, an (optional) optical filter 1105 and an image sensor 1106. Lens 1104 has an optical axis 1108. Lens 1104 is a cut lens. The cutting is performed such that a height of lens 1104 ("$H_L$", measured along the y-axis) is 5.1 mm, as shown in FIG. 11A. This means that a cut ratio, i.e. a ratio between which a height of a lens element differs from its width, is 20% or less. Cutting a lens like lens 1104 is beneficial as of two desired outcomes: it reduces a height of the cut lens itself (what reduces $MH_S$) and it reduces a height of an OPFE such as OPFE 1102 (what reduces $MH_M$). Specifically, cutting a lens by X % will reduce $MH_M$ and $MH_S$ by about 0.5·X %-X %. For example, cutting a lens by 20% will reduce $MH_M$ and $MH_S$ by about 10%-20%.

In FIG. 11C is visible that image sensor 1106 is oriented in an anti-parallel STC sensor configuration. Orienting image sensor 1106 in an anti-parallel STC sensor configuration is beneficial as it aligns a fast scan axis of OPFE 1102 with a longer side of s-$FOV_T$ and a slow scan axis of OPFE 1102 with a shorter side of s-$FOV_T$. Therefore, a maximum rotational movement required for covering s-$FOV_T$ can be smaller than in STCs that use a parallel STC sensor configuration. For example and for covering a 16:9 ratio of $FOV_W$=82° (diagonal), for STC 1250 (anti-parallel STC sensor configuration) a maximum rotational movement of OPFE 1102 is 21.35° (see Table 12), whereas for STC 250 and optical lens system 1000 (parallel STC sensor configuration) a maximum rotational movement of OPFE 252 and OPFE 1002 is 29.8° (see Table 2) and 25.5° (see Table 3) respectively. Smaller maximum rotational movements are beneficial, as they can be provided by simpler actuators as well as simpler and more accurate actuation control.

Detailed optical data and surface data are given in Tables 10-11. An effective f/#based on an effective lens aperture diameter as known in the art is given.

TABLE 10

Example 1100
EFL = 14.1 mm, Eff. f number = 2.43 (Eff. DA/2 = 2.9 mm), HFOV = 13.7 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | -1.058 | 3.000 | | | | |
| 2 | Lens 1 | ASP | 4.430 | 1.600 | 3.001 | Glass | 1.48 | 84.1 | 9.556 |
| 3 | | | 85.664 | 1.088 | 2.967 | | | | |
| 4 | Lens 2 | ASP | 8.627 | 0.819 | 2.773 | Plastic | 1.53 | 55.69 | 12.034 |
| 5 | | | -24.809 | 0.109 | 2.716 | | | | |
| 6 | Lens 3 | ASP | -8.650 | 0.503 | 2.691 | Plastic | 1.61 | 25.59 | -4.544 |
| 7 | | | 4.256 | 0.517 | 2.414 | | | | |
| 8 | Lens 4 | ASP | 7.547 | 1.600 | 2.412 | Plastic | 1.67 | 19.24 | 8.497 |
| 9 | | | -22.121 | 0.037 | 2.520 | | | | |
| 10 | Lens 5 | ASP | 5.421 | 0.788 | 2.424 | Plastic | 1.61 | 25.59 | -15.577 |
| 11 | | | 3.276 | 2.994 | 2.293 | | | | |
| 12 | Lens 6 | ASP | -17.791 | 0.683 | 2.797 | Plastic | 1.53 | 55.69 | -81.994 |
| 13 | | | -30.272 | 2.382 | 3.001 | | | | |
| 14 | IR Filter | Plano | Infinity | 0.210 | — | Glass | 1.52 | 64.17 | |
| 15 | | | Infinity | 0.350 | — | | | | |
| 16 | Image | Plano | Infinity | — | — | | | | |

TABLE 11

Aspheric Coefficients

| Surface # | Conic | $4^{th}$ | $6^{th}$ | $8^{th}$ | $10^{th}$ | $12^{th}$ | $14^{th}$ | $16^{th}$ |
|---|---|---|---|---|---|---|---|---|
| 2 | 0 | -5.19E-04 | -1.78E-05 | -4.48E-06 | -8.07E-08 | -1.64E-08 | -8.77E-10 | 1.34E-10 |
| 3 | 0 | -1.12E-03 | 2.33E-04 | -4.20E-05 | 4.57E-06 | -4.19E-07 | 2.34E-08 | -6.24E-10 |
| 4 | 0 | -6.44E-03 | 6.51E-04 | -4.40E-05 | 2.04E-06 | 8.43E-08 | 7.98E-09 | -1.44E-09 |
| 5 | 0 | -2.21E-04 | 4.15E-04 | 3.01E-05 | 1.90E-05 | -3.57E-06 | 1.45E-07 | 4.15E-09 |
| 6 | 0 | 7.41E-03 | -1.55E-03 | 2.67E-04 | -2.54E-05 | 2.21E-06 | -2.67E-07 | 1.70E-08 |
| 7 | 0 | -5.36E-03 | 1.97E-04 | -3.28E-05 | -1.36E-06 | 1.91E-06 | -4.06E-07 | 4.19E-08 |
| 8 | 0 | 1.57E-03 | -1.49E-03 | 2.62E-04 | -8.49E-05 | 1.59E-05 | -2.24E-06 | 1.37E-07 |
| 9 | 0 | -8.09E-03 | 5.64E-04 | -3.26E-04 | 7.59E-05 | -9.18E-06 | 5.63E-07 | -1.18E-08 |

TABLE 11-continued

| | | Aspheric Coefficients | | | | | | |
|---|---|---|---|---|---|---|---|---|
| Surface # | Conic | $4^{th}$ | $6^{th}$ | $8^{th}$ | $10^{th}$ | $12^{th}$ | $14^{th}$ | $16^{th}$ |
| 10 | 0 | −3.63E−02 | 2.08E−03 | 2.51E−04 | −2.96E−05 | 2.33E−06 | −2.20E−07 | 8.14E−09 |
| 11 | 0 | −2.75E−02 | 1.60E−03 | 9.49E−04 | −3.33E−04 | 5.92E−05 | −5.44E−06 | 2.06E−07 |
| 12 | 0 | −1.02E−02 | 2.26E−04 | −1.51E−04 | 5.00E−05 | −8.69E−06 | 8.68E−07 | −3.28E−08 |
| 13 | 0 | −9.62E−03 | −1.91E−05 | 1.57E−05 | −3.19E−06 | 4.16E−07 | −3.72E−08 | 2.12E−09 |

With reference to FIG. 7, a s-$FOV_T$ of STC 1250 covers 69.4°×42.6°. It is noted that s-$FOV_T$ covers a 16:9 ratio of $FOV_W$ of a Wide (or Main) camera such as 130 having a (diagonal) $FOV_W$=82°. Table 12 provides the rotation values of OPFE 1202 around a first and a second rotation respectively that are required for scanning to the 9 respective n-$FOV_T$s shown in FIG. 7. The values refer to a scanning action that starts from n-$FOV_T$ 5, i.e. the (Center, Center) position. For example for scanning n-$FOV_T$ to n-$FOV_T$ 9 or (Bottom, Right), starting from (Center, Center) position n-$FOV_T$ 5, OPFE 1202 must be rotated by −13.18 degrees around the first rotation axis and by −8.9 degrees around the second rotation axis.

TABLE 12

| | Left | Center | Right |
|---|---|---|---|
| Top | (9.2, 21.35) | (12.05, 0) | (9.2, −21.35) |
| Center | (−1.99, 17) | (0, 0) | (−1.99, −17) |
| Bottom | (−13.18, 8.9) | (−12.05, 0) | (−13.18, −8.9) |

Figure 12:
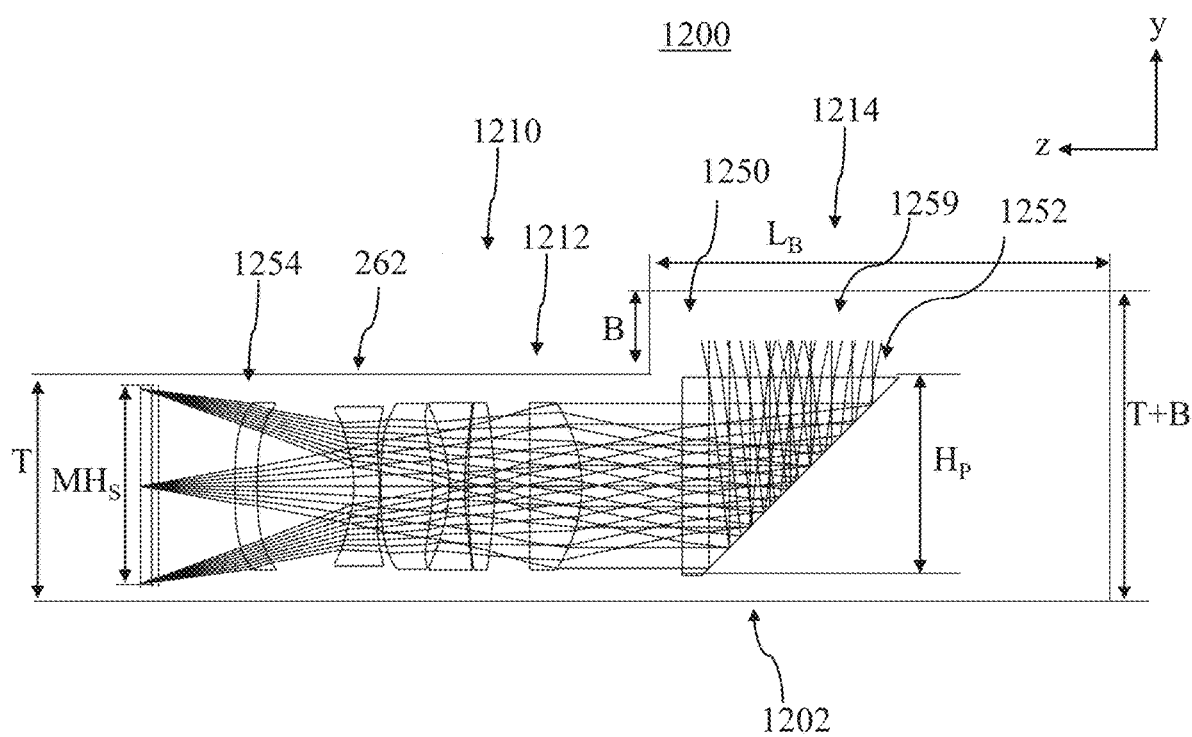
FIG. 12 shows a mobile device including a STC which includes the yet another optical lens system of FIGS. 11A-C.

FIG. 12 shows a mobile device 1200 (e.g. a smartphone) including a STC 1250 in a cross-sectional view. STC 1250 may include optical lens system 1100 shown in FIGS. 11A-C. Mobile device 1200 has a front surface 1202 (e.g. including a screen, not shown) and a rear surface 1210 including STC 1250's aperture 1259. Mobile device 1200 has a regular region 1212 of thickness "T" and a camera bump region 1214 that is elevated by a height B over regular region 1212. Bump region 1214 has a bump length ("$L_B$") and a bump thickness T+B. For achieving short $L_B$, a module region 1252 of STC 1250 having a height $MH_M$ is included in bump region 1214 and shoulder region 1254 of STC 1250 having a height $MH_S$<$MH_M$ is included in regular region 1312. This means that OPFE 1102 is included in bump region 1214 and lens 1104 and image sensor 1106 are included in regular region 1212. Optionally, in some embodiments, parts of shoulder region 1254 may also be included in bump region 1214.

Figure 13A:
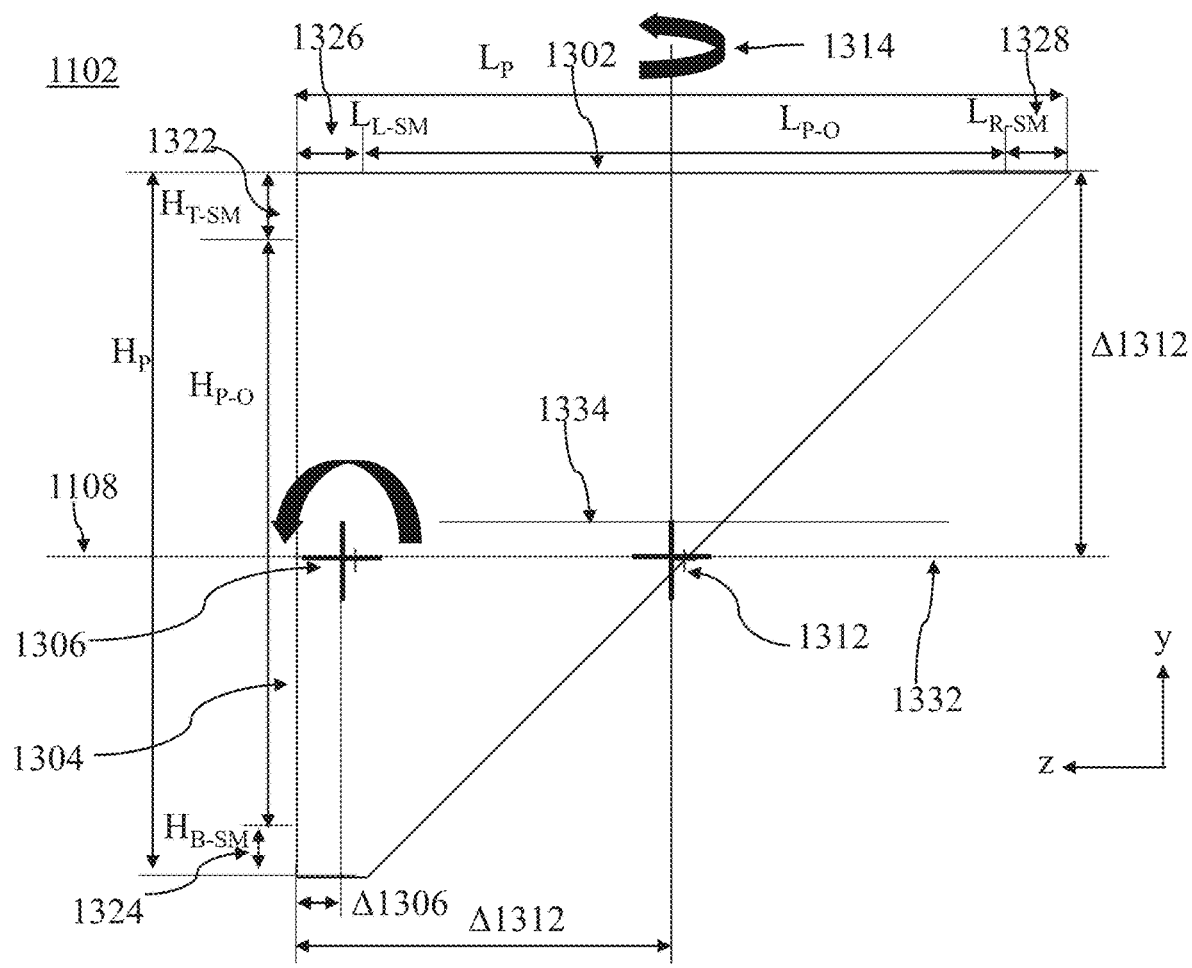
FIG. 13A shows a prism included in the yet another optical lens system of FIGS. 11A-C in a side view.
Figure 13B:
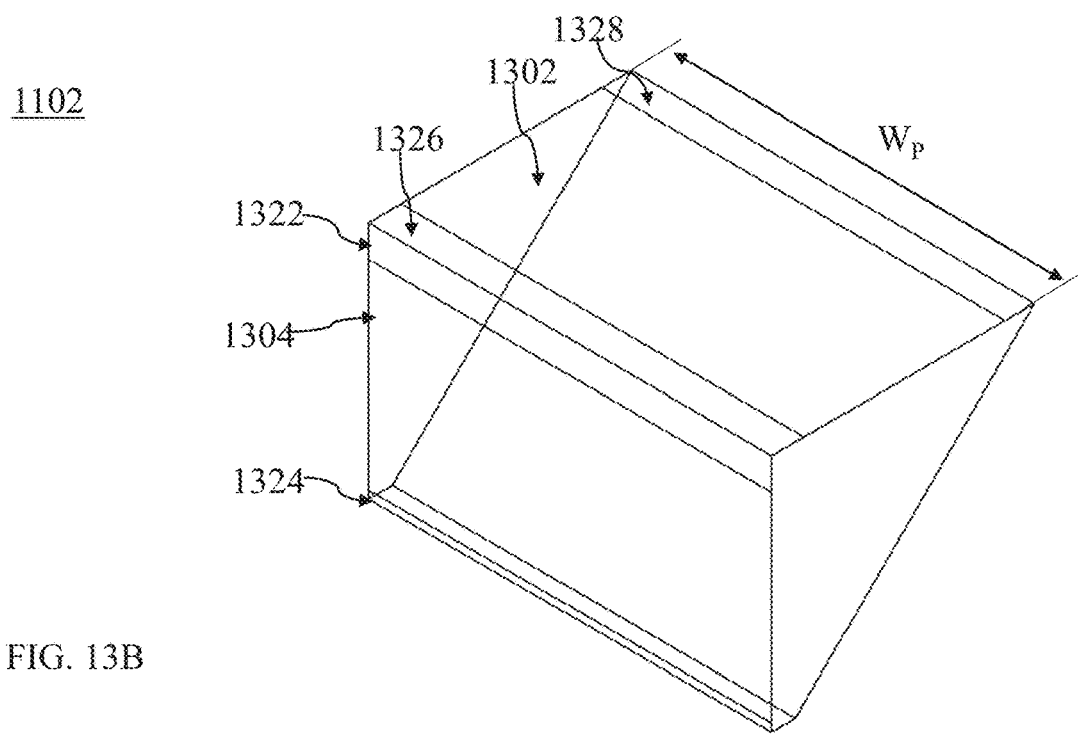
FIG. 13B shows the prism of FIG. 13A in a perspective view.

FIGS. 13A-B show OPFE 1102 (here, a prism) of STC 1250 in a zero scan position. FIG. 13A shows OPFE 1102 in a side (or cross-sectional) view. FIG. 13B shows OPFE 1102 in a perspective view.

OPFE 1102 has a light entering surface 1302 and a light exiting surface 1304. The location of first rotation axis 1306 and second rotation axis 1312 are shown. OPFE 1102 has a prism height ("$H_P$") and an optical (or optically active) prism height ("$H_{P-O}$"), a prism length ("$L_P$") and an optical prism length ("$L_{P-O}$") and a prism width ("$W_P$"), as shown.

A distance from first rotation axis 1306 to OPFE 1102's light exiting surface 1304 is Δ1306. Here, Δ1306=0.5 mm and a ratio of Δ1306 and the prism length $L_P$ is Δ1306/$L_P$=0.07. This de-center location of OPFE 1102 is beneficial for minimizing $MH_M$. A distance from second rotation axis 1312 to OPFE 1102's light entering surface 1302 is Δ1312. Here, Δ1312=3.35 mm and a ratio of Δ1312 and the prism height is Δ1312/$H_P$=0.55.

OPFE 1102 has a non-cut center axis 1332 that indicates a center of a non-cut OPFE 1102 with respect to the y-axis. OPFE 1102 has a cut center axis 1334 that indicates a center of cut OPFE 1102 with respect to the y-axis. Both first rotation axis 1306 and second rotation axis 1312 intersect with optical axis 1108 of lens 1104 and with non-cut center axis 1332. In other words and referring to FIG. 4D and FIGS. 6A-D, in optical lens system 1100 ΔC=0.

OPFE 1102 includes an exiting-surface top stray light prevention mask 1322 having a height $H_{T-SM}$, an exiting-surface bottom stray light prevention mask 1324 having a height $H_{B-SM}$, an entering-surface left stray light prevention mask 1326 having a length LL-SM and an entering-surface right stray light prevention mask 1328 having a length $L_{R-SM}$. Values and ranges are given in Table 13 in mm. The stray light prevention masks are beneficial because they prevent stray light from reaching an image sensor such as image sensor 1106. Stray light is undesired light emitted or reflected from an object in a scene which enters a camera's aperture and reaches an image sensor at a light path that is different from a planned (or desired) light path. A planned light path is described as follows:
1. Light is emitted or reflected by an object in a scene.
2. Light enters a camera's aperture.
3. For examples where the OPFE is a mirror, light is reflected once at the mirror's surface. For examples where the OPFE is a prism, light passes once a light entering surface of the prism, is reflected once at the prism's reflective surface, and then passes once a light exiting surface of the prism.
4. Light passes once all surfaces of a lens.
5. Light impinges on an image sensor.

Light that reaches an image sensor on any light path other than the planned light path described above is considered undesired and referred to as stray light.

Values and ranges are given in Table 13 in mm.

$L_{P-O}$/$L_P$=0.76, i.e. left stray light prevention mask 1326 and right stray light prevention mask 1328, which are located at the light entering surface 1302, together cover a surface area of more than 20% and less than 30% of the area of the light entering surface 1302. $H_{P-O}$/$H_P$=0.83, i.e. top stray light prevention mask 1322 and bottom stray light prevention mask 1324 which are located at the light exiting surface 1304, together cover a surface area of more than 10% and less than 20% of the area of the light entering surface 1304.

TABLE 13

| | Value | Value range |
|---|---|---|
| $H_P$ | 6.11 | 3-10 |
| $H_{P-O}$ | 5.1 | 2-10 |

TABLE 13-continued

| | Value | Value range |
|---|---|---|
| $L_P$ | 6.72 | 3-12 |
| $L_{P-O}$ | 5.13 | 2-12 |
| $W_P$ | 10.3 | 4-15 |
| $H_{T-SM}$ | 0.81 | 0.1-2.5 |
| $H_{B-SM}$ | 0.2 | 0.05-2.5 |
| $L_{L-SM}$ | 0.83 | 0.1-4 |
| $L_{R-SM}$ | 0.76 | 0.1-4 |
| $\Delta 1306$ | 0.5 | 0.2-3 |
| $\Delta 1312$ | 3.35 | 1.5-6 |

Table 14 summarizes values and ratios thereof of various features that are included in STC 200, STC 250 and STC 1230 and optical lens systems 800, 900, 1000 and 1100. $H_{G1}$, $W_{G1}$, $H_{G2}$, $W_{G2}$, $\Delta C$, HA, WA, DA, $HA_{G2}$, $WA_{G2}$, $DA_{G2}$, $H_P$, $W_P$, $L_P$, $\Delta LO$, TTL, BFL, EFL, $EFL_{G1}$, $EFL_{G2}$, SD, $H_{sensor}$, $MH_S$, $MH_M$, $H_S$, $H_M$, ALT, $ALT_{G1}$, $ALT_{G2}$, $T_1$, $f_1$ are given in mm. n-$FOV_T$, S-$FOV_T$, α-OPFE and β-OPFE are given in degrees.

In other examples, the values may differ from the values given here by e.g. ±10%, or by ±20%, or by even ±30%.

"Type" specifies whether the optical lens system uses a parallel STC sensor configuration ("P") or an anti-parallel STC sensor configuration ("A-P").

"16:9 W ratio" indicates whether the s-$FOV_T$ of the respective optical lens system covers ("Y") or not covers ("N") a 16:9 ratio of a Wide camera having a diagonal $FOV_W=82°$.

DA is the aperture diameter. For cut lenses, an effective aperture diameter is given. "Effective aperture diameter" means here a diameter of a circular (or axial symmetric) aperture, wherein the circular aperture has a same aperture area as the cut lens (which has a non axial-symmetric aperture).

$EFL_{G1}$ and $EFL_{G2}$ are the effective focal lengths of lens groups G1 and G2 respectively.

The average lens thickness ("ALT") measures the average thickness of all lens elements. $ALT_{G1}$ and $ALT_{G2}$ is the ALT of G1 and G2 respectively.

$T_1$ is the center thicknesses of $L_1$. $F_1$ is the focal length of $L_1$.

All other parameters not specifically defined here have their ordinary meaning as known in the art.

TABLE 14

| Parameter | 800 | 900 | 1000 | 1100 | Explanation |
|---|---|---|---|---|---|
| Type | P | P | P | A-P | Sensor configuration |
| $H_{G1}$ | 6.00 | 5.00 | 5.00 | 5.10 | Optical height of G1 |
| $W_{G1}$ | 8.00 | 6.00 | 6.00 | 6.00 | Optical width of G1 |
| $H_{G2}$ | 4.40 | — | — | — | Optical height of G2 |
| $W_{G2}$ | 5.56 | — | — | — | Optical width of G2 |
| $\Delta C$ | 0.15 | 0.15 | 0.15 | 0.00 | Lens-OPFE de-center |
| HA | 6.00 | 5.00 | 5.00 | 5.10 | Aperture height of lens |
| WA | 8.00 | 6.00 | 6.00 | 6.00 | Aperture width of lens |
| DA | 7.40 | 5.75 | 5.75 | 5.80 | Aperture diameter of lens |
| $HA_{G2}$ | 4.40 | — | — | — | HA of G2 |
| $WA_{G2}$ | 5.56 | — | — | — | WA of G2 |
| $DA_{G2}$ | 5.24 | — | — | — | DA of G2 |
| $H_P$ | 6.80 | 6.80 | 6.80 | 6.11 | Height of prism |
| $W_P$ | 13.50 | 11.00 | 11.00 | 10.30 | Width of prism |
| $L_P$ | 7.70 | 7.70 | 7.70 | 6.72 | Length of prism |
| $\Delta LO$ | 2.70 | 2.70 | 2.70 | 3.10 | Distance lens-OPFE |
| TTL | 18.72 | 12.41 | 14.52 | 13.68 | |
| BFL | 5.84 | 1.50 | 3.93 | 2.94 | |
| EFL | 17.37 | 14.10 | 14.10 | 14.10 | |
| $EFL_{G1}$ | 21.47 | — | — | — | EFL of G1 |
| $EFL_{G2}$ | 1969.60 | — | — | — | EFL of G2 |
| f number | 2.35 | 2.45 | 2.45 | 2.43 | |
| n-$FOV_T$ | 25.6° | 22.8° | 31° | 27.40° | Diagonal n-$FOV_T$ |
| s-$FOV_T$ | 50.9° × 32.5° | 69.5° × 42.58° | 69.5° × 42.58° | 69.4° × 42.6° | |
| 16:9 W ratio | N | Y | Y | Y | |
| α-OPFE | ±7.85° | ±11.67 | ±9.67 | ±13.18 | Maximal rotation around 1$^{st}$ rotation axis (402, 452, 1306) |
| β-OPFE | ±21.67° | ±29.80 | ±25.54 | ±21.35 | Maximal rotation around 2$^{nd}$ rotation axis (502, 552, 1312) |
| SD | 8.00 | 5.60 | 8.00 | 7.00 | Image sensor diagonal |
| $H_{sensor}$ | 4.80 | 1.68 | 2.40 | 5.60 | Sensor height |
| $MH_M$ | 8.24 | 8.84 | 8.48 | 7.48 | Minimum module height |
| $MH_S$ | 6.16 | 5.95 | 6.18 | 5.34 | Minimum shoulder height |
| $H_M$ | 9.74 | 10.34 | 9.98 | 8.98 | Module height |
| $H_S$ | 7.66 | 7.45 | 7.68 | 6.84 | Shoulder height |
| ALT | 1.74 | 0.82 | 1.33 | 1.00 | Average thickness of lens elements L1-L6 |
| $ALT_{G1}$ | 2.72 | — | — | — | ALT of G1 |
| $ALT_{G2}$ | 1.25 | — | — | — | ALT of G2 |
| $T_1$ | 3.00 | 1.94 | 2.71 | 1.60 | Center thickness of $L_1$ |
| $f_1$ | 10.42 | 7.62 | 9.05 | 9.56 | Focal length of $L_1$ |
| $\Delta C/HA$ | 0.025 | 0.030 | 0.030 | 0.000 | |
| $\Delta C/H_S$ | 0.02 | 0.020 | 0.020 | 0.000 | |
| $\Delta C/H_O$ | 0.022 | 0.022 | 0.022 | 0.000 | |
| D-cut ratio (Lens, G1) | 0.75 | 0.83 | 0.83 | 0.85 | =HA/WA |

TABLE 14-continued

| Parameter | 800 | 900 | 1000 | 1100 | Explanation |
|---|---|---|---|---|---|
| D-cut ratio (G2) | 0.79 | — | — | — | $=H_{G2}/W_{G2}$ |
| D-cut ratio (OPFE) | 0.88 | 0.88 | 0.88 | 0.91 | $=H_O/L_O$ |
| EFL/TTL | 0.93 | 1.14 | 0.97 | 1.03 | |
| BFL/EFL | 0.34 | 0.11 | 0.28 | 0.21 | |
| BFL/TTL | 0.31 | 0.12 | 0.27 | 0.21 | |
| $DA/DA_{G2}$ | 1.41 | — | — | — | |
| $DA/H_S$ | 0.97 | 0.77 | 0.75 | 0.85 | |
| $WA/H_S$ | 1.04 | 0.81 | 0.78 | 0.88 | |
| $DA/H_M$ | 0.76 | 0.56 | 0.58 | 0.65 | |
| $H_{G1}/H_{G2}$ | 1.37 | — | — | — | |
| $H_{G1}/MH_S$ | 0.97 | 0.84 | 0.81 | 0.96 | |
| $H_{G1}/MH_M$ | 0.73 | 0.57 | 0.59 | 0.68 | |
| $H_{G1}/H_S$ | 0.78 | 0.67 | 0.65 | 0.75 | |
| $H_{G1}/H_M$ | 0.62 | 0.48 | 0.50 | 0.57 | |
| $H_S/H_M$ | 0.79 | 0.72 | 0.77 | 0.76 | |
| SD/EFL | 0.46 | 0.40 | 0.57 | 0.50 | |
| $T_1$/ALT | 1.73 | 2.37 | 2.04 | 1.60 | |
| $ALT_{G1}$/ALT | 1.56 | — | — | — | |
| $ALT_{G2}$/ALT | 0.72 | — | — | — | |
| $ALT_{G1}/ALT_{G2}$ | 2.17 | — | — | — | |
| $f_1$/EFL | 0.60 | 0.54 | 0.64 | 0.68 | |
| ΔLO/TTL | 0.14 | 0.22 | 0.19 | 0.23 | |

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

Furthermore, for the sake of clarity the term "substantially" is used herein to imply the possibility of variations in values within an acceptable range. According to one example, the term "substantially" used herein should be interpreted to imply possible variation of up to 5% over or under any specified value. According to another example, the term "substantially" used herein should be interpreted to imply possible variation of up to 2.5% over or under any specified value. According to a further example, the term "substantially" used herein should be interpreted to imply possible variation of up to 1% over or under any specified value.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present disclosure.

What is claimed is:

1. A scanning Tele camera (STC), comprising:
   a single optical path folding element (OPFE) for folding a first optical path OP1 that defines a height H axis to a second optical path OP2 that defines a length L axis;
   an OPFE actuator;
   a lens having a lens optical axis parallel to OP2, an effective focal length EFL in the range of 8 mm-50 mm, and a f number f/#<3.5; and
   an image sensor,
   wherein the STC has a STC native field-of-view n-$FOV_T$,
   wherein the OPFE actuator is configured to rotate the OPFE around a first rotation axis and around a second rotation axis for scanning a scene with the n-FOV that provides an effective Tele scanning FOV s-$FOV_T$,
   wherein the s-$FOV_T$ has a longer side and a shorter side, and
   wherein the longer side of s-$FOV_T$ is greater than 40 degrees.

2. The STC of claim 1, wherein the first rotation axis is perpendicular to both OP1 and OP2, and wherein the second rotation axis is parallel to OP1.

3. The STC of claim 1, wherein the OPFE has an OPFE length $L_O$ measured along an axis parallel to OP2, an OPFE light entering surface and an OPFE light exiting surface, wherein the first rotation axis is located at a distance Δ1 from the light exiting surface of the OPFE, and wherein $Δ1/L_O<0.25$.

4. The STC of claim 3, wherein $Δ1/L_O<0.15$.

5. The STC of claim 1, wherein f/#<3.

6. The STC of claim 1, wherein f/#<2.5.

7. The STC of claim 1, wherein the STC is included in a dual-camera that comprises a Wide camera having a Wide camera field of view $FOV_W$, and wherein a center location of s-$FOV_T$ is identical with a center location of $FOV_W$.

8. The STC of claim 7, wherein $FOV_W$ is in the range of 50-120 degrees, and wherein s-$FOV_T$ covers a 16:9 segment of $FOV_W$.

9. The STC of claim 7, wherein $FOV_W$ is in the range of 75-85 degrees, and wherein s-$FOV_T$ covers a 16:9 segment of $FOV_W$.

10. The STC of claim 1, wherein the longer side of s-$FOV_T$ is greater than 45 degrees.

11. The STC of claim 1, wherein the longer side of s-$FOV_T$ is greater than 50 degrees.

12. The STC of claim 1, wherein the shorter side of s-$FOV_T$ is greater than 20 degrees.

13. The STC of claim 1, wherein the shorter side of s-$FOV_T$ is greater than 25 degrees.

14. The STC of claim 1, wherein the shorter side of s-$FOV_T$ is greater than 30 degrees.

15. The STC of claim 1, wherein the rotation of the OPFE along the first rotation axis is by more than ±5 degrees around a zero scan position.

16. The STC of claim 1, wherein the rotation of the OPFE along the second rotation axis is by more than ±15 degrees around a zero scan position.

17. The STC of claim 1, wherein the OPFE is a prism.

18. The STC of claim 1, wherein the lens has a maximum lens aperture height $H_A$ measured along OP1, wherein the STC is included in a camera module, wherein the camera module is divided into a module region having a module region height $H_M$ and a shoulder region having a shoulder region height $H_S<H_M$, all heights being measured along OP1, and wherein $H_S<H_A+3$ mm.

19. The STC of claim 1, wherein the STC is included in a mobile device.

20. The STC of claim 19, wherein the mobile device is a smartphone.

* * * * *